US006811487B2

(12) United States Patent
Sengoku

(10) Patent No.: US 6,811,487 B2
(45) Date of Patent: Nov. 2, 2004

(54) USING TRANSFERRED OPERATION KEY STATUS DATA TO SYNCHRONIZE GAMES RUNNING ON MULTIPLE INDEPENDENT GAME SYSTEMS

(75) Inventor: Toshio Sengoku, Uji (JP)

(73) Assignee: Nintendo Co., Ltd., Kyoto (JP)

( * ) Notice: Subject to any disclaimer, the term of this patent is extended or adjusted under 35 U.S.C. 154(b) by 193 days.

(21) Appl. No.: 10/021,302

(22) Filed: Dec. 19, 2001

(65) Prior Publication Data

US 2002/0077179 A1 Jun. 20, 2002

(30) Foreign Application Priority Data

Dec. 20, 2000 (JP) ........................................ 2000-387524

(51) Int. Cl.[7] ........................ A63F 13/12; G09G 5/399; G06F 15/16; G06F 3/00
(52) U.S. Cl. .............................. 463/42; 463/1; 463/43; 345/539; 709/200; 710/53; 710/55
(58) Field of Search ................................. 463/1, 36–39, 463/40–45; 273/148 B, 459–461; 345/156, 161, 539; 709/200, 208, 238; 710/1, 5, 29, 52–55

(56) References Cited

U.S. PATENT DOCUMENTS

| | | | | |
|---|---|---|---|---|
| 5,396,225 A | * | 3/1995 | Okada et al. .................. | 463/40 |
| 5,428,528 A | * | 6/1995 | Takenouchi et al. ........... | 463/42 |
| 5,502,443 A | * | 3/1996 | Newberry .................... | 340/825 |
| 5,607,157 A | * | 3/1997 | Nagashima .............. | 273/148 B |
| 5,618,045 A | * | 4/1997 | Kagan et al. .................. | 463/40 |
| 5,685,775 A | * | 11/1997 | Bakoglu et al. ............... | 463/41 |
| 5,702,305 A | * | 12/1997 | Norman et al. ................ | 463/42 |
| 5,738,583 A | * | 4/1998 | Comas et al. .................. | 463/40 |
| 5,838,909 A | * | 11/1998 | Roy et al. .................... | 709/209 |
| 5,971,855 A | * | 10/1999 | Ng .............................. | 463/42 |
| 6,030,292 A | * | 2/2000 | Hirano et al. ................. | 463/43 |
| 6,042,476 A | * | 3/2000 | Ohashi et al. ................. | 463/40 |
| 6,042,477 A | * | 3/2000 | Addink ........................ | 463/42 |
| 6,165,068 A | * | 12/2000 | Sonoda et al. .................. | 463/8 |
| 6,238,291 B1 | * | 5/2001 | Fujimoto et al. .............. | 463/44 |

FOREIGN PATENT DOCUMENTS

| | | | | |
|---|---|---|---|---|
| CA | 2054978 A | * | 5/1992 | ............ A63F/9/00 |
| EP | 485227 A2 | * | 5/1992 | ........... H04L/29/06 |
| GB | 2353928 A | | 7/2001 | |
| JP | A-176235 | | 11/1990 | |

* cited by examiner

Primary Examiner—Teresa Walberg
Assistant Examiner—Scott E. Jones
(74) Attorney, Agent, or Firm—Nixon & Vanderhye P.C.

(57) ABSTRACT

When users simultaneously play the same game with interconnected game machines, processing delays would conventionally cause inconsistencies in game content between different game machines. To solve this problem, the game machines are not synchronized with one another, but each game machine outputs operation key status data representing the state of a set of number of operation controls to the other game machines in accordance with predetermined data communication timing. A received FIFO data buffer in each game machine, sequentially stores operation key status data received from the other game machines. Only valid operation control status data is transferred to an operation data buffer for use in game processing. Inconsistencies in game content between different game machines are prevented through software-based synchronization which does not require hardware-based synchronization.

24 Claims, 15 Drawing Sheets

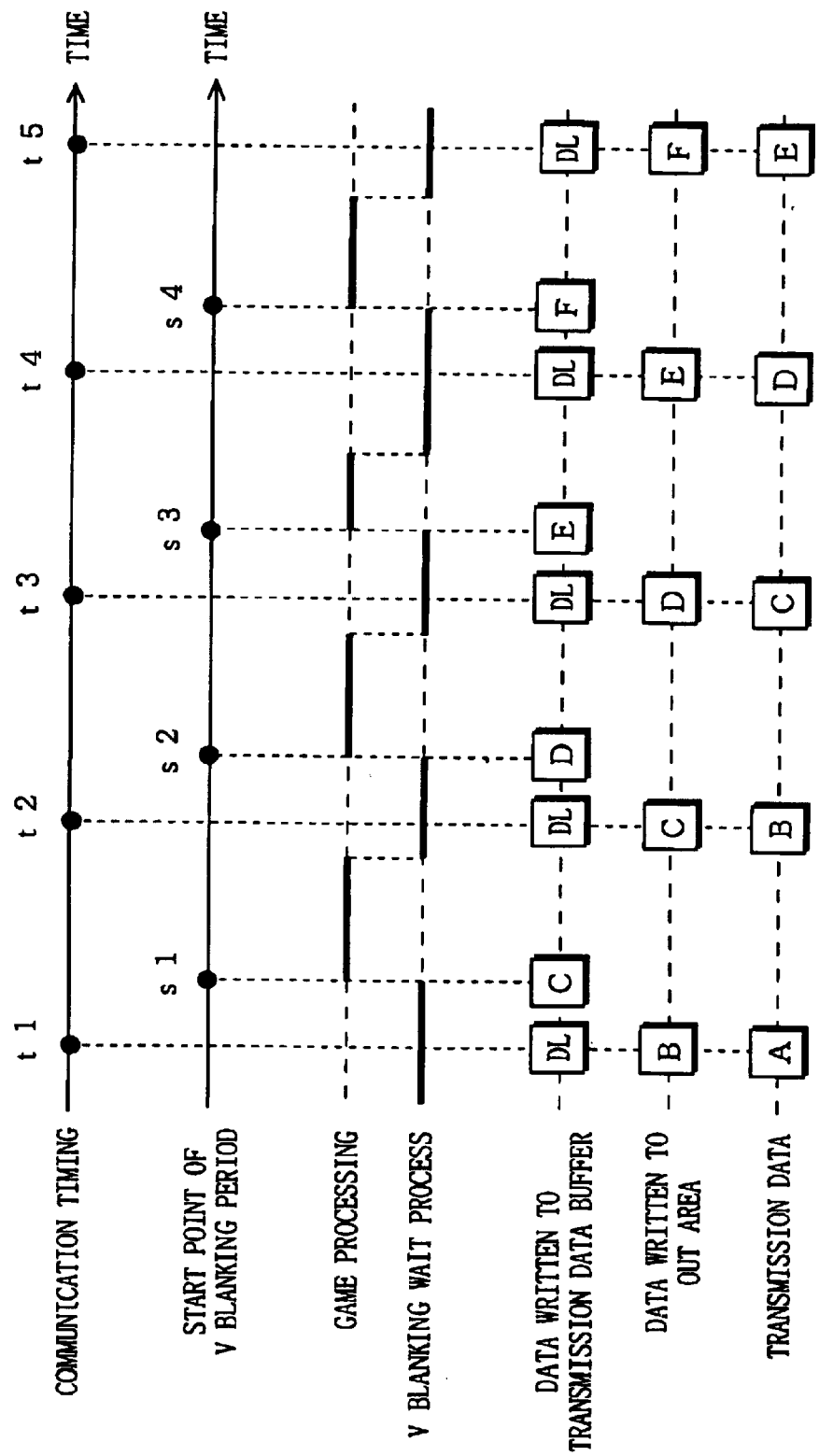

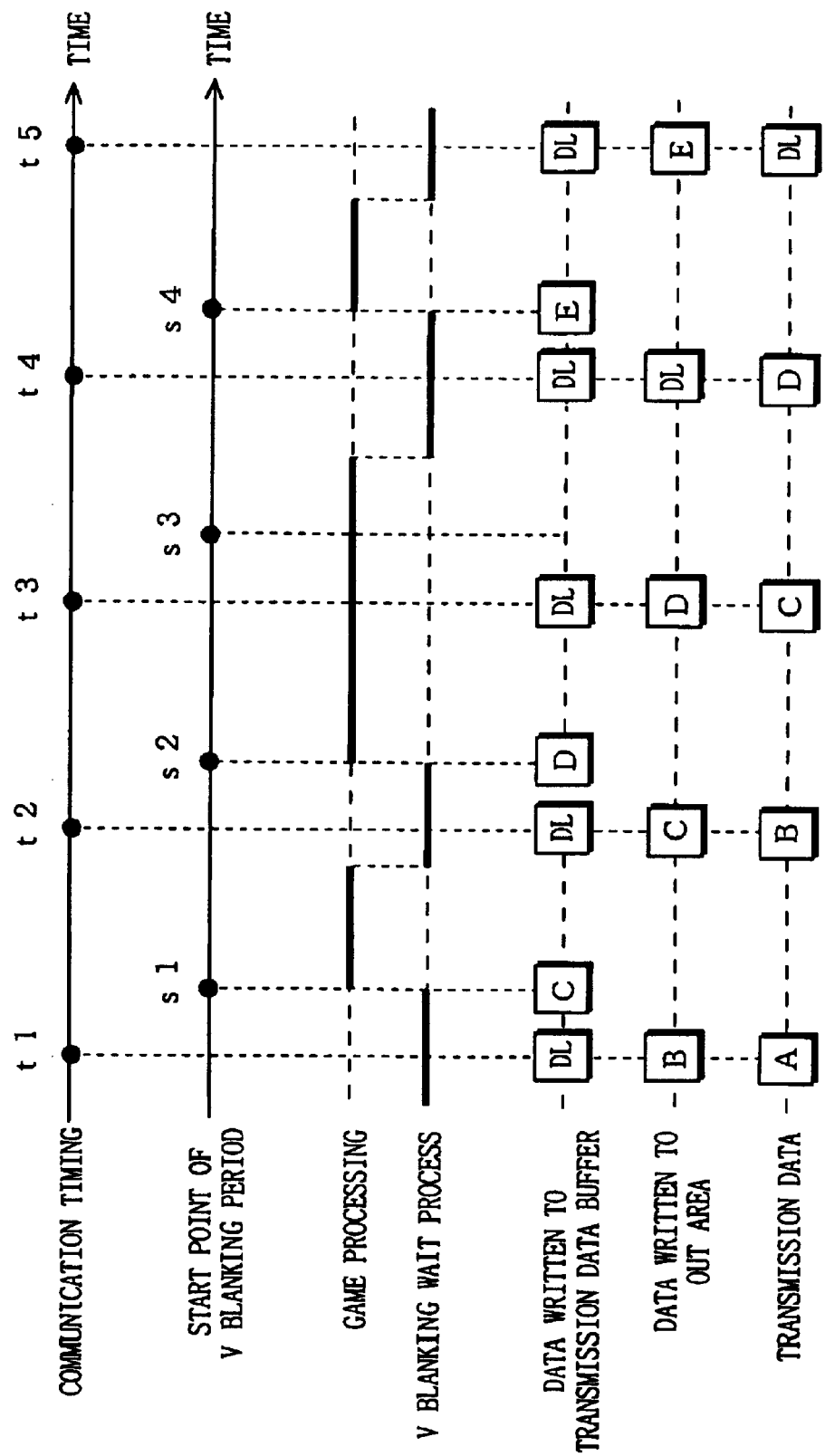

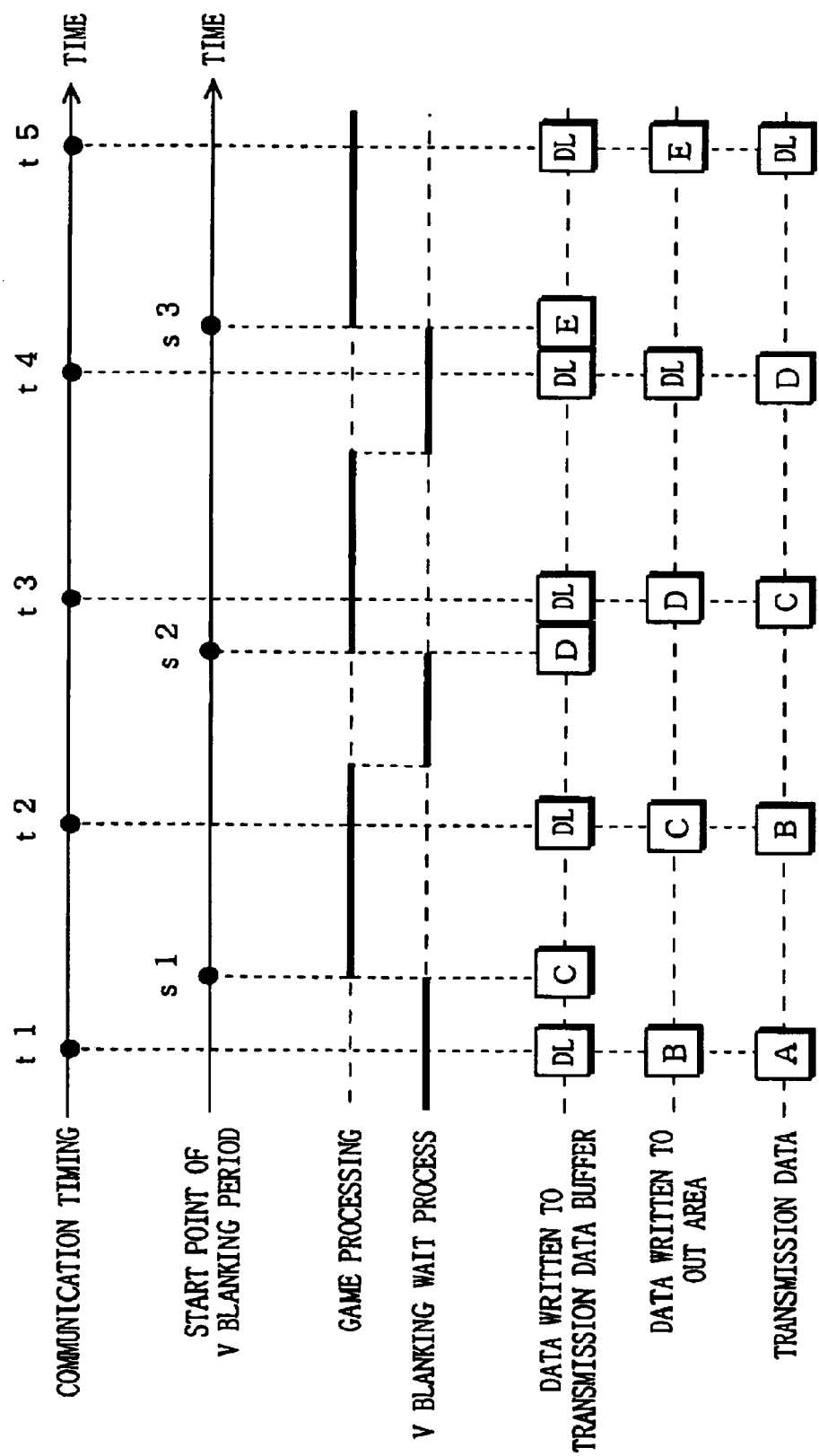

USING TRANSFERRED OPERATION KEY STATUS DATA TO SYNCHRONIZE GAMES RUNNING ON MULTIPLE INDEPENDENT GAME SYSTEMS

CROSS-REFERENCES TO RELATED APPLICATIONS

STATEMENT REGARDING FEDERALLY SPONSORED RESEARCH OR DEVELOPMENT

Not applicable

BACKGROUND OF THE INVENTION

1. Field of the Invention

The present invention relates to an on-line game system as well as a game apparatus and a game information storage device for use with the on-line game system. More particularly, the present invention relates to an on-line game system including a plurality of game apparatuses which are interconnected to one another so as to allow communications to occur therebetween with predetermined communication timing, as well as a game apparatus and a game information storage device for use with such an on-line game system.

2. Description of the Background Art

Conventionally, "on-line" game systems are available which comprise a plurality of game machines that are mutually interconnected so as to allow data communications to occur therebetween. In such an on-line game system, a plurality of players can operate their respective game machines to simultaneously participate in a game (such as a duel-type game), such that the players may generally share the same game content at each given moment.

In such an on-line game system, various kinds of trigger information, which may be generated in response to specific key operations made by a player on one game machine, are transmitted to the other game machines so that all of the interconnected game machines can perform predetermined game processing based on the shared information. For example, if a player on one game machine performs a key operation for causing a character "A" in the game to jump, then trigger information indicating that "character A jumps" is transmitted to the other game machines. All of the interconnected game machines perform appropriate game processing based on the trigger information. Thus, the key operation performed by the player on each game machine is reflected in the game content on the other game machines.

However, since the individual game machines in the above-described on-line game system are run with their own clocks, there may be some inconsistencies in the game progression or contents experienced on different game machines. For example, consider a case in which each game machine transmits data to the other game machines during the machine's own V blanking period. During the time one V blanking period transitions to another on a relatively "slow" game machine, two V blanking periods could occur on a relatively "fast" game machine. In this situation, the data which is transmitted by the relatively fast game machine during the first V blanking period may be overwritten by the data which is transmitted during the second V blanking period, even before the first data can be properly processed by the relatively slow game machine. As a result, the data which is transmitted during the first V blanking period fails to be reflected in the game processing of the relatively slow game machine. This may result in an inconsistency such that, for example, while character A appears to jump in the game as played on the relatively fast game machine, it does not appear to jump in the same game as played on the relatively slow game machine.

As a proposal to solve the aforementioned problem, Japanese Patent Laid-Open Publication No. 4-176235 discloses a communication adapter for game machines. The disclosed communication adapter is capable of, in accordance with its own clock, transmitting or receiving data concerning a given game to/from a plurality of interconnected game machines. Data communication occurs on a communication-cycle-by-communication-cycle basis. In each communication cycle, the data which are received from the respective game machines in a previous communication cycle are transmitted to all of the game machines; in the meantime, the next communication data are received from the respective game machines. After the communication cycle is over, each game machine performs its game processing in accordance with the data received from all of the interconnected game machines, and also prepares itself to be ready for a next communication cycle. In other words, the game machines perform their game processing in accordance with a data communication timing scheme which is governed by the communication adapter, thereby generally preventing inconsistencies in game content between different game machines.

However, in accordance with an on-line game system employing the aforementioned communication adapter for game machines, data communication is effectuated without confirming whether or not any valid transmission data has become ready at each game machine prior to the communication. As a result, if one of the game machines has not been able to prepare any transmission data in time due to delay in its game processing or for any other reasons, then the transmission data which may be left in a transmission data buffer from the previous communication, or some other irrelevant or invalid data, may end up being transmitted. As a result, some inconsistencies may still result between the game content as played on that game machine and the game content as played on the other game machines.

SUMMARY OF THE INVENTION

Therefore, an objective of the present invention is to provide an on-line game system which allows a game to be simultaneously played on a plurality of game machines while preventing any inconsistencies in game content between different game machines.

A first aspect of a presently preferred example illustrative but non-limiting embodiment of the present invention is directed to an on-line game system comprising a plurality of interconnected game apparatuses (100a to 100d) to allow a plurality of users to simultaneously play the same game software program. Each of the plurality of game apparatuses comprises:

at least one operation key (10) for user manipulation;

communication means (30, 40) for being coupled to the other game apparatus or game apparatuses to receive and transmit operation key status data representing a state of the at least one operation key;

buffer storage means (50) for sequentially storing operation key status data associated with the plurality of game apparatuses in response to a round of data communication; and operation data storage means (60) for storing operation key status data associated with each of the plurality of game apparatuses, the operation key status data being for use with game processing.

When the operation key status data stored in the buffer storage means as a result of a given round of data communication include valid operation key status data and invalid data, only the valid operation key status data among the operation key status data resulting from a plurality of rounds of data communication including the given round are transferred to the operation data storage means, without transferring the invalid data, so that at least one such valid operation key status data is transferred for each of the plurality of game apparatuses.

Thus, even if a plurality of data which are stored in the buffer storage means in response to a given round of data communication include invalid data, valid operation key status data is retrieved for each game apparatus from among the data stored in the buffer storage means in response to a plurality of rounds of data communication including the given round (the valid operation key status data being used for game processing). As a result, inconsistencies in game content between different game apparatuses can be prevented.

According to a further aspect, when the operation key status data stored in the buffer storage means as a result of a given round of data communication include invalid data, none of the operation key status data resulting from the given round of data communication is transferred (FIG. 5 (b)). When all of the operation key status data resulting from the given round of data communication are valid, all of the operation key status data resulting from the given round of data communication are transferred (FIG. 5(a), (c)).

Thus, according to this further aspect, unless all of the operation key status data from the game apparatuses as stored in the buffer storage means in response to a given round of data communication are valid, the operation key status data are not utilized for game processing. As a result, inconsistencies in game content between different game apparatuses can be prevented.

According to a still further aspect, when the operation key status data stored in the buffer storage means as a result of a given round of data communication include valid operation key status data and invalid data, only the valid operation key status data are transferred (S316) to the operation data storage means. Thus, one valid operation key status data is transferred for each of the plurality of game apparatuses, wherein the one valid operation key status data for each game apparatus is an earliest valid operation key status data among the operation key status data resulting from a plurality of rounds of data communication including the given round (FIG. 7(a) to (c)).

Thus, according to this aspect, even if a plurality of data which are stored in the buffer storage means in response to a given round of data communication include invalid data, the valid operation key status data (i.e., all the operation key status data except the invalid data), if any, are established as data for use with game processing each time. As a result, it is possible to more quickly retrieve valid operation key status data (one for each game apparatus).

According to yet another aspect, the invalid data includes delayed processing notice data ("DL" in FIGS. 13 to 15) for notifying the other game apparatus or game apparatuses of delayed processing.

Thus, according to this aspect, a game apparatus which is suffering from delayed processing notifies the other game apparatus of the delay, so that inconsistencies in game content between different game apparatuses can be prevented.

According to a still further aspect, the on-line game system further comprises transmission data buffer means (20) for temporarily storing data to be transmitted, wherein: the delayed processing notice data is written (S612) to the transmission data buffer means after the data is transferred out of the transmission data buffer means. Thereafter, when the operation key status data is input to the transmission data buffer means, the delayed processing notice data is overwritten (S332) by the operation key status data.

Thus, according to this aspect, delayed processing notice data is previously written to the transmission data buffer means for temporarily storing transmission data in case there is any delay in the processing. Thus, the delayed processing notice data can be automatically transmitted if transmission data cannot be prepared in time.

According to yet another aspect, one of the plurality of game apparatuses has a function of initiating (S512) data communication.

Thus, according to this aspect, the system configuration can be simplified because there is no need to separately provide a device for controlling data communication, which can be handled by one of the game apparatuses itself.

A further exemplary non-limiting illustrative embodiment of the present invention is directed to an on-line game system comprising a plurality of interconnected game apparatuses (100a to 100d) to allow a plurality of users to simultaneously play the same game software program. Each of the plurality of game apparatuses comprises:

at least one operation key (10) for user manipulation;

communication means (30, 40) for being coupled to the other game apparatus or game apparatuses to receive and transmit operation key status data representing a state of the at least one operation key;

buffer storage means (50) for sequentially storing operation key status data associated with the plurality of game apparatuses in response to a round of data communication;

operation data storage means (60) for storing operation key status data associated with each of the plurality of game apparatuses, the operation key status data being for use with game processing; and transfer means (70) for transferring the operation key status data stored in the buffer storage means to the operation data storage means.

Wherein, when the operation key status data stored in the buffer storage means as a result of a given round of data communication include valid operation key status data and invalid data, only the valid operation key status data among the operation key status data resulting from a plurality of rounds of data communication including the given round are transferred by the transfer means to the operation data storage means, without transferring the invalid data—so that at least one such valid operation key status data is transferred for each of the plurality of game apparatuses.

Thus, even if a plurality of data which are stored in the buffer storage means in response to a given round of data communication include invalid data, valid operation key status data is retrieved for each game apparatus from among the data stored in the buffer storage means in response to a plurality of rounds of data communication including the given round, the valid operation key status data being used for game processing. As a result, inconsistencies in game content between different game apparatuses can be prevented.

A further exemplary non-limiting preferred embodiment of the present invention is directed to a game apparatus (100)

for being interconnected to another game apparatus to be used in a plurality to allow a plurality of users to simultaneously play the same game software program. In this exemplary arrangement, the game apparatus comprises:

at least one operation key (10) for user manipulation;

communication means (30,40) for being coupled to the other game apparatus or game apparatuses to receive and transmit operation key status data representing a state of the at least one operation key;

buffer storage means (50) for sequentially storing operation key status data associated with the plurality of game apparatuses in response to a round of data communication; and operation data storage means (60) for storing operation key status data associated with each of the plurality of game apparatuses, the operation key status data being for use with game processing.

When the operation key status data stored in the buffer storage means as a result of a given round of data communication include valid operation key status data and invalid data, only the valid operation key status data among the operation key status data resulting from a plurality of rounds of data communication including the given round are transferred to the operation data storage means, without transferring the invalid data, so that at least one such valid operation key status data is transferred for each of the plurality of game apparatuses. Thus, even if a plurality of data which are stored in the buffer storage means in response to a given round of data communication include invalid data, valid operation key status data is retrieved for each game apparatus from among the data stored in the buffer storage means in response to a plurality of rounds of data communication including the given round, the valid operation key status data being used for game processing. As a result, inconsistencies in game content between different game apparatuses can be prevented.

According to a further aspect, when the operation key status data stored in the buffer storage means as a result of a given round of data communication include invalid data, none of the operation key status data resulting from the given round of data communication is transferred (FIG. 5(b)). When all of the operation key status data resulting from the given round of data communication are valid, all of the operation key status data resulting from the given round of data communication are transferred (FIGS. 5(a), (c)). Thus, unless all of the operation key status data from the game apparatuses as stored in the buffer storage means in response to a given round of data communication are valid, the operation key status data are not utilized for game processing. As a result, inconsistencies in game content between different game apparatuses can be prevented.

According to yet another aspect, when the operation key status data stored in the buffer storage means as a result of a given round of data communication include valid operation key status data and invalid data, only the valid operation key status data are transferred (S316) to the operation data storage means, so that one valid operation key status data is transferred for each of the plurality of game apparatuses. In this aspect, the one valid operation key status data for each game apparatus is an earliest valid operation key status data among the operation key status data resulting from a plurality of rounds of data communication including the given round (FIG. 7(a) to (c)).

Thus, even if a plurality of data which are stored in the buffer storage means in response to a given round of data communication include invalid data, the valid operation key status data (i.e., all the operation key status data except the invalid data), if any, are established as data for use with game processing each time. As a result, it is possible to more quickly retrieve valid operation key status data, one for each game apparatus.

According to yet another aspect, the invalid data includes delayed processing notice data ("DL" in FIGS. 13 to 15) for notifying the other game apparatus or game apparatuses of delayed processing. Thus, a game apparatus which is suffering from delayed processing notifies the other game apparatus of the delay, so that inconsistencies in game content between different game apparatuses can be prevented.

According to yet another aspect, the game apparatus further comprises transmission data buffer means (20) for temporarily storing data to be transmitted. The delayed processing notice data is written (S612) to the transmission data buffer means after the data is transferred out of the transmission data buffer. Thereafter, when the operation key status data is input to the transmission data buffer means, the delayed processing notice data is overwritten (S332) by the operation key status data.

Thus, delayed processing notice data is previously written to the transmission data buffer means for temporarily storing transmission data in case there is any delay in the processing. Thus, the delayed processing notice data can be automatically transmitted if transmission data cannot be prepared in time.

According to yet another aspect, the game apparatus has a function of initiating (S512) data communication. Thus, it is possible to simplify the configuration of an on-line game system incorporating the game apparatus because there is no need to separately provide a device for controlling data communication, which can be handled by the game apparatuses itself.

A still further exemplary non-limiting but illustrative embodiment of the present invention is directed to a game apparatus (100) for being interconnected to another game apparatus to be used in a plurality to allow a plurality of users to simultaneously play the same game software program. The apparatus includes:

at least one operation key (10) for user manipulation;

communication means (30, 40) for being coupled to the other game apparatus or game apparatuses to receive and transmit operation key status data representing a state of the at least one operation key;

buffer storage means (50) for sequentially storing operation key status data associated with the plurality of game: apparatuses in response to a round of data communication;

operation data storage means (60) for storing operation key status data associated with each of the plurality of game apparatuses, the operation key status data being for use with game processing; and transfer means (70) for transferring the operation key status data stored in the buffer storage means to the operation data storage means.

When the operation key status data stored in the buffer storage means as a result of a given round of data communication include valid operation key status data and invalid data, only the valid operation key status data among the operation key status data resulting from a plurality of rounds of data communication including the given round are transferred by the transfer means to the operation data storage means, without transferring the invalid data, so that at least one such valid operation key status data is transferred for each of the plurality of game apparatuses.

Thus, even if a plurality of data which are stored in the buffer storage means in response to a given round of data communication include invalid data, valid operation key status data is retrieved for each game apparatus from among the data stored in the buffer storage means in response to a plurality of rounds of data communication including the given round, the valid operation key status data being used for game processing. As a result, inconsistencies in game content between different game apparatuses can be prevented.

A still further exemplary non-limiting illustrative embodiment of the present invention is directed to a storage device (80) storing a computer-readable format. The storage device has stored therein a program for causing a game apparatus (100a to 100d) interconnected to at least one other game apparatus to be used to allow a plurality of users to simultaneously play the same game software program. The stored program includes the following routines:

generating operation key status data representing a state of at least one operation key which is subjected to user manipulation;

receiving and transmitting the operation key status data from/to the other game apparatus or game apparatuses;

sequentially storing (S604) operation key status data associated with the plurality of interconnected game apparatuses in response to a round of data communication; and retrieving, from among the plurality of sequentially stored operation key status data, the operation data associated with each of the plurality of game apparatuses for use with game processing.

The retrieving routine comprises:

retrieving, when the operation key status data stored as a result of a given round of data communication include valid operation key status data and invalid data, only the valid operation key status data among the operation key status data resulting from a plurality of rounds of data communication including the given round, so that at least one such valid operation key status data is retrieved for each of the plurality of game apparatuses, without retrieving the invalid data.

Thus, even if a plurality of data which are stored in response to a given round of data communication include invalid data, valid operation key status data is retrieved for each game apparatus from among the data stored in response to a plurality of rounds of data communication including the given round, the valid operation key status data being used for game processing. As a result, inconsistencies in game content between different game apparatuses can be prevented.

According to yet another aspect, the retrieving step comprises:

retrieving, when operation key status data stored as a result of a given round of data communication include invalid data, none of the operation key status data resulting from the given round of data communication (FIG. 5(*b*)); and retrieving, when all of the operation key status data resulting from the given round of data communication are valid, all of the operation key status data resulting from the given round of data communication (FIGS. 5(*a*), (*c*)).

Thus, unless all of the operation key status data from the game apparatuses as stored in response to a given round of data communication are valid, the operation key status data are not utilized for game processing. As a result, inconsistencies in game content between different game apparatuses can be prevented.

According to yet another aspect, the retrieving step comprises retrieving (S316), when the operation key status data stored as a result of a given round of data communication include valid operation key status data and invalid data, only the valid operation key status data, so that one valid operation key status data is retrieved for each of the plurality of game apparatuses. The one valid operation key status data for each game apparatus is an earliest valid operation key status data among the operation key status data resulting from a plurality of rounds of data communication including the given round (FIGS. 7(*a*) to (*c*)).

Thus, even if a plurality of data which are stored in response to a given round of data communication include invalid data, the valid operation key status data (i.e., all the operation key status data except the invalid data), if any, are established as data for use with game processing each time. As a result, it is possible to more quickly retrieve valid operation key status data, one for each game apparatus.

According to yet another aspect, the invalid data includes delayed processing notice data ("DL" in FIGS. 13 to 15) for notifying the other game apparatus or game apparatuses of delayed processing. Thus, a game apparatus which is suffering from delayed processing notifies the other game apparatus of the delay, so that inconsistencies in game content between different game apparatuses can be prevented.

According to yet another aspect, the program stored in the storage device causes the game apparatus to further execute a step of temporarily storing data to be transmitted to the other game apparatus or game apparatuses. The step comprises:

writing (S612) the delayed processing notice data after transferring the stored data; and thereafter, when the operation key status data is input, overwriting (S332) the delayed processing notice data with the operation key status data.

Thus, delayed processing notice data is previously written when temporarily storing transmission data, in case there is any delay in the processing. Thus, the delayed processing notice data can be automatically transmitted if transmission data cannot be prepared in time.

According to yet another aspect, the program stored in the storage device causes the game apparatus to further execute a step of initiating (S512) data communication. Thus, it is possible to simplify the configuration of an on-line game system utilizing the storage device because there is no need to separately provide a device for controlling data communication, which can be handled by the game apparatuses itself.

Note that any alphanumerical notation in parentheses in the above SUMMARY OF THE INVENTION section is given for the sake of clarity and not intended as any limitation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a timing diagram illustrating an exemplary manner in which operation key status data is transmitted under an ideal operation;

FIG. 14 is a flowchart illustrating an exemplary manner in which delayed processing notice data is transmitted when there is delay in game processing; and FIG. 15 is a flowchart illustrating an exemplary manner in which delayed processing notice data is transmitted in the case where the data communication cycle does not coincide with the cycle of V blanking periods.

DETAILED DESCRIPTION OF THE PRESENTLY PREFERRED EXEMPLARY NON-LIMITING ILLUSTRATIVE EMBODIMENTS

Hereinafter, the present invention will be described by way of illustrative examples, with reference to the accompanying figures.

(Overall Structure)

Figure 1:
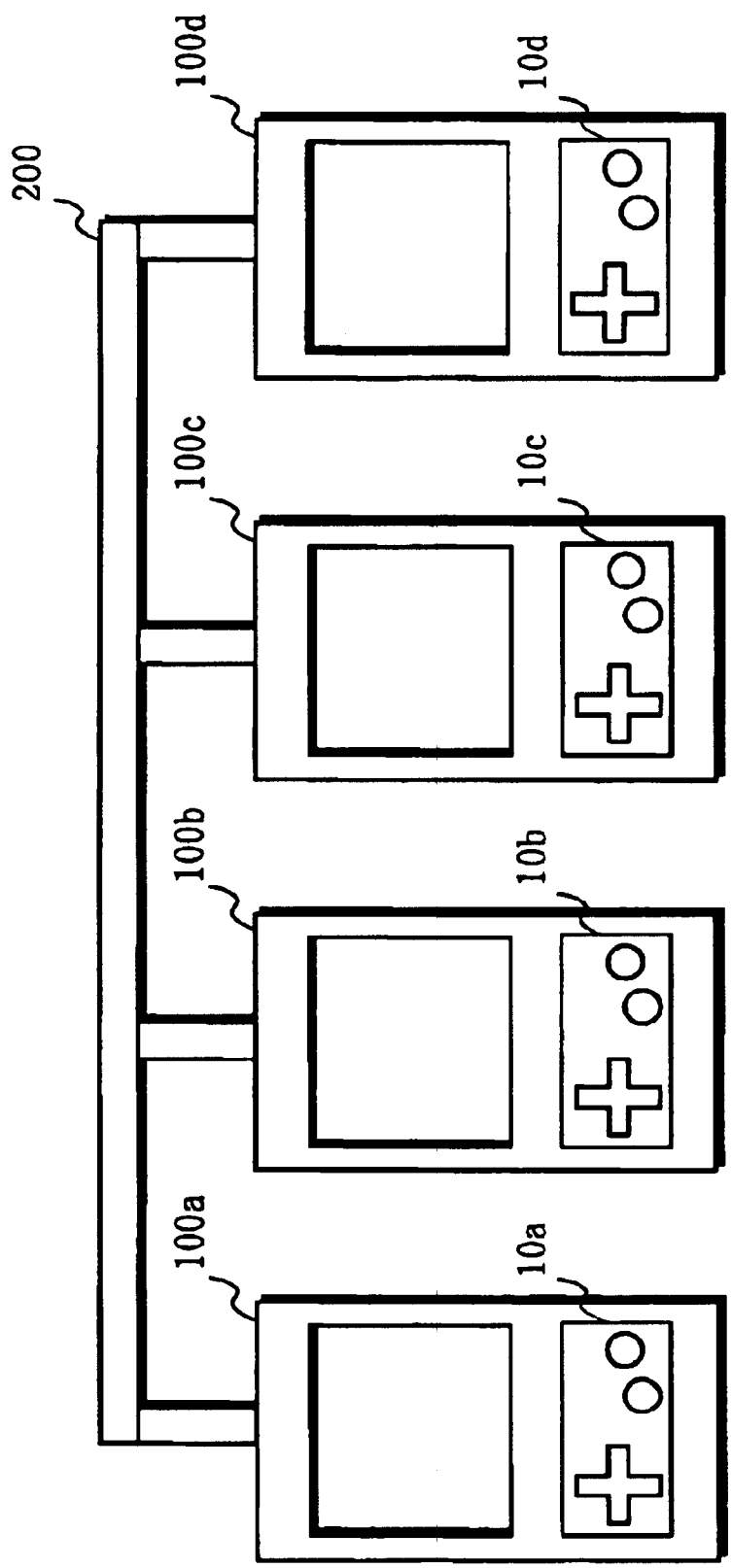
FIG. 1 is a schematic diagram illustrating an overall illustrative configuration of an on-line game system according to a presently preferred exemplary embodiment of the present invention.

With reference to FIG. 1, the overall structure of an on-line game system according to one exemplary embodiment of the present invention will be described. The on-line game system includes four game machines 100a to 100d and a communication cable 200. The game machines 100a to 100d are interconnected to one another via the communication cable 200. The game machines 100a to 100d include player operation sections 10a to 10d, respectively, which are subject to manipulation by a user. Since the four game machines 100a to 100d are structurally identical in this particular non-limiting example, they may be collectively referred to as, e.g., "game machine (s) 100" or "operation section (s) 10", unless it is particularly necessary to distinguish between the game machines 100a to 100d or any component elements thereof. Also, for ease of illustration, the game machines 100a to 100d may conveniently be referred to as the "first machine", "second machine", "third machine", and "fourth machine". Although four game machines 100a–100d are shown, any number of game machines could be used. Moreover, since the first machine plays a main role in initiating communications in the present exemplary embodiment, the first machine may be referred to as a "parent machine", while the second to fourth machines may be referred to as its "daughter machines".

(Exemplary Structure of Each Game Machine)

Figure 2:
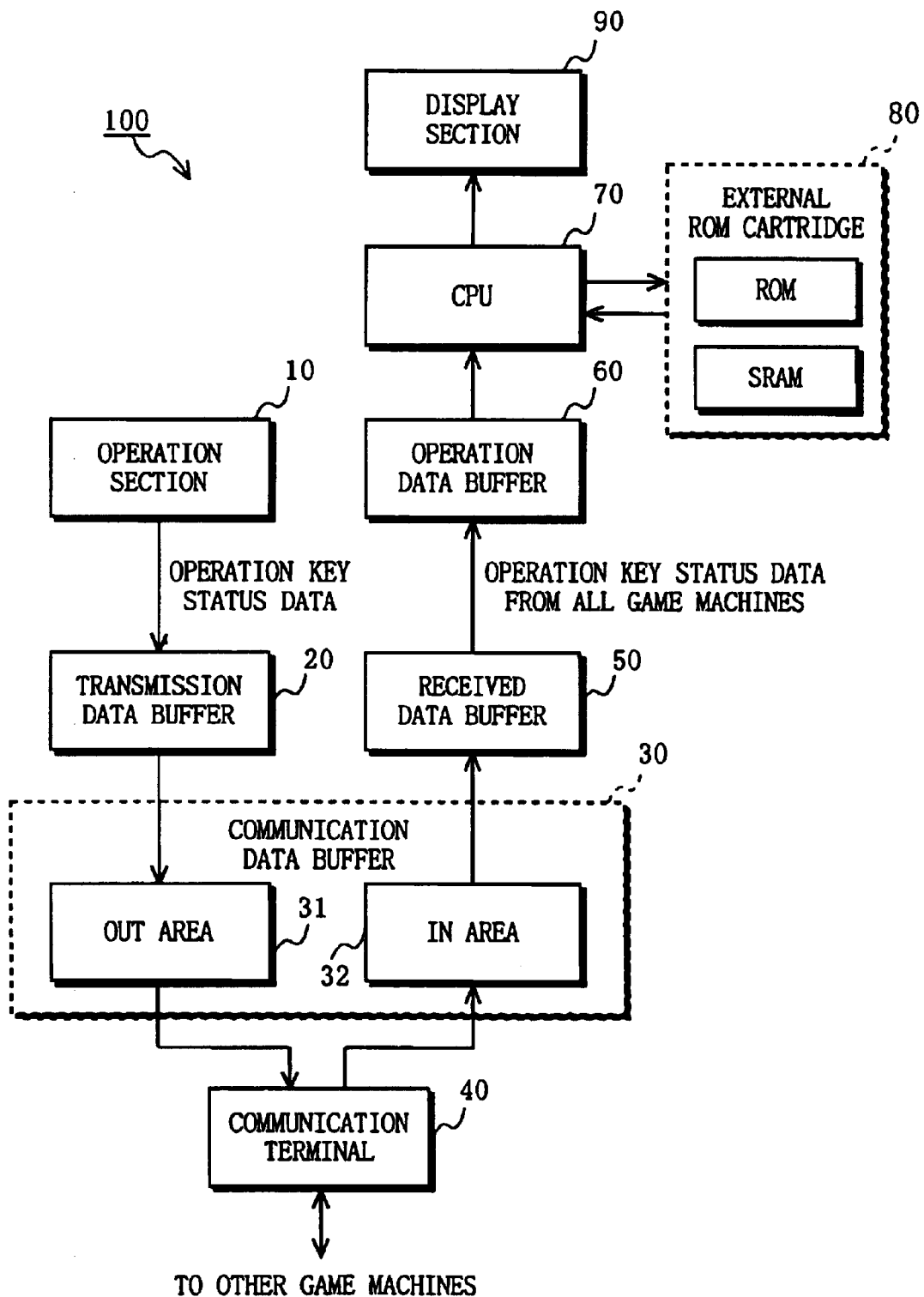
FIG. 2 is a block diagram illustrating an exemplary structure of a game machine 100.

With reference to FIG. 2, the structure of each game machine 100 will be described. The game machine 100 includes an operation section 10, a transmission data buffer 20, a communication data buffer 30, a communication terminal 40, a received data buffer 50, an operation data buffer 60, a CPU 70, an external ROM cartridge 80, and a display section 90. The communication data buffer 30 includes an Out area 31 and an In area 32.

(General Operation of Each Game Machine)

Now, the general operations of the respective components of each game machine 100 will be described. The operation section 10 includes a plurality of operation keys or other controls such as, for example, a four-position cross-switch, one or more analog or digital joysticks, push buttons, or other controls. Herein, the term "operation key" will be used to refer to each of these controls and other variations. As a user depresses these operation keys, operation control status data which corresponds to the depressed set of operation key(s) is stored in the transmission data buffer 20 in accordance with predetermined timing. The operation key status data includes a plurality of bits which respectively correspond to the operation keys in the operation section 10. For example, the operation key status data may take the value "0" to indicate that a button which is associated therewith is being depressed, and the value "1" to indicate that a button which is associated therewith is not being depressed.

The operation key status data which is temporarily stored in the transmission data buffer 20 is transferred to the Out area 31 of the communication data buffer 30 in accordance with predetermined timing. The communication data buffer 30, which serves as a communication means for transmitting or receiving operation key status data to/from the other game apparatus(es), is coupled to the communication cable 200 via the communication terminal 40.

The operation key status data which has been transferred to the Out area 31 of the communication data buffer 30 is transmitted to all of the game machines 100a to 100d which are coupled to the communication cable 200 at a predetermined communication timing point. At this communication timing point, each of the game machines 100a to 100d which are coupled to the communication cable 200 transmits its own operation key status data in the aforementioned manner. Thus, via on-line communication, the operation key status data associated with all of the game machines 100a to 100d are stored in the In area 32 of the communication data buffer 30 of each game machine 100.

The operation key status data associated with all of the game machines 100a to 100d, which are stored in the In area 32 of the communication data buffer 30, are transferred to the received data buffer 50 in accordance with predetermined timing. The received data buffer 50, which is a FIFO buffer (first-in-first-out buffer) capable of storing a plurality of data in the order of storage, allows the plurality of data to be sequentially read in the order in which they were stored.

The operation key status data associated with all of the game machines 100a to 100d, which have been transferred to the received data buffer 50, are transferred to the operation data buffer 60 in accordance with predetermined timing.

The removable storage device 80 which can be attached to or detached from the game machine 100, is in this particular non-limiting example composed of an external ROM cartridge including for example ROM and SRAM for storing a program which embodies a game along with data to be used for the game. Other embodiments could use floppy diskettes, optical disks, or other storage media to store the game program. From each of the operation key status data associated with all of the game machines 100a to 100d which have been transferred to the operation data buffer 60, the CPU 70 extracts trigger information. Based on the extracted trigger information and the program and data which are stored in the external storage medium 80, the CPU 70 performs game processing so as to display images on a display section 90 based on the processing results. It will be appreciated that not only the game processing but also the aforementioned various data transfer processes are executed by the CPU 70 based on a program (s) stored in the external storage medium 80, although such details are omitted from the description herein.

Figure 3:
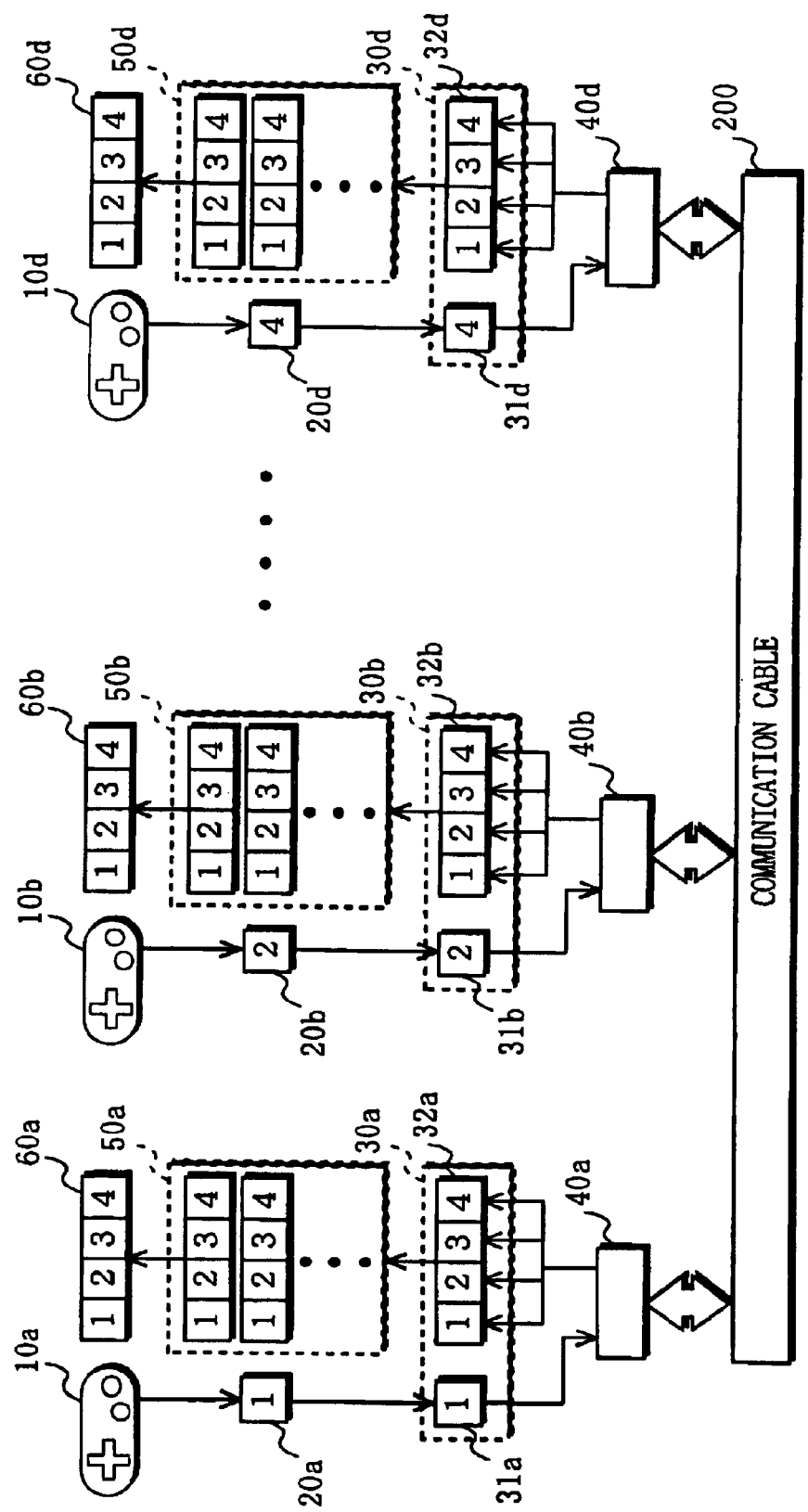
FIG. 3 is a diagram illustrating an exemplary flow of operation key status data in respective game machines.

FIG. 3 schematically shows a flow of example illustrative processes through which the operation key status data associated with the game machines 100a to 100d are passed to the operation data buffers 60a to 60d. In FIG. 3, the numerals "1" to "4" indicated in each buffer section identify the numbers of the game machines from which the operation key status data are received for storage in that buffer.

(Non-limiting Advantages Resulting From the Use of Operation Key Status Data)

Figure 4:
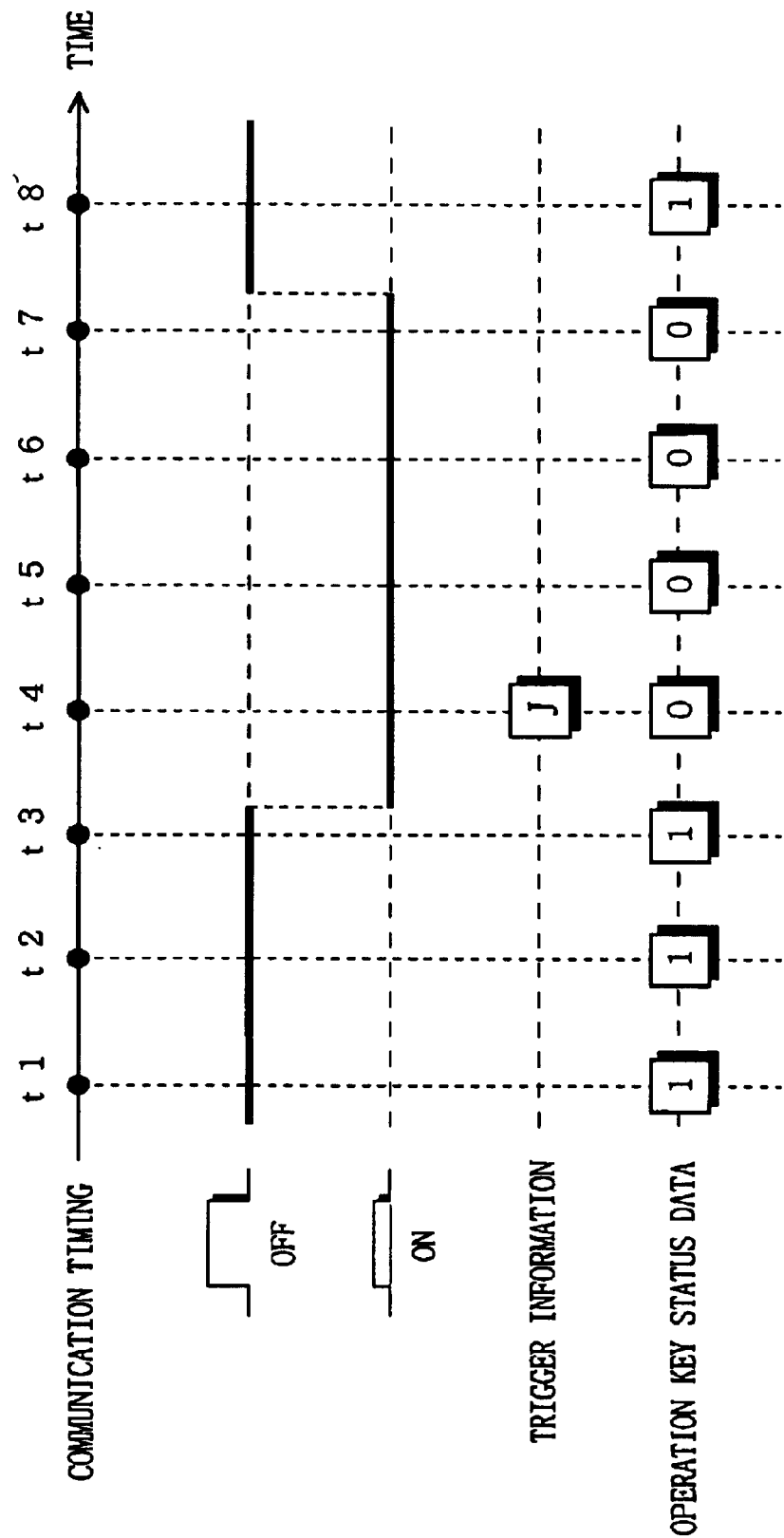
FIG. 4 is a timing diagram illustrating exemplary effects obtained by transmitting operation key status data as transmission data.

As described above, according to one non-limiting embodiment, the data ("operation key status data") concerning the state of the operation keys in the operation section 10 of each game machine is exchanged between the game machines. This avoids the need to exchange any data of trigger information (which may indicate that "character A jumps", for example), between the game machines. The effects and advantages resulting from this feature of the present invention will be described with reference to FIG. 4. FIG. 4 illustrates respective example transmission data which are transmitted at communication timing points t1 to t8 in relation to changing states of an operation key in the operation section 10. It is herein assumed that this operation key is a button for causing character A to jump in the game. Since a player's action of depressing and then releasing a button is substantially slow relative to the processing speed of a game machine, the duration of a button depression would typically span a number of communication timing points (e.g., t4 to t7, as shown in FIG. 4).

For comparison, the exchange of trigger information between the game machines will be described first. While a button is depressed between communication timing points t3 and t4, trigger information ("J") indicating that "character A jumps" is extracted, and transmitted to the other game machines at communication timing point t4. Based on the trigger information "J", the other game machines perform game processing for causing character A to jump in the game.

With continued reference to FIG. 4, the exchange of operation key status data between the game machines according to a presently preferred example non-limiting embodiment of the present invention will now be described. In this case, the operation key state is transmitted to the other game machines at each of communication timing points t1 to t8. More specifically, the operation key status data "1", which represents that the button of interest is not being depressed, is transmitted at communication timing points t1 to t3 and t8. The operation key status data "0", which represents that the button of interest is being depressed, is transmitted at communication timing points t4 to t7. Any other game machine which receives such operation key status data extracts the trigger information indicating that "character A jumps" at communication timing point t4 (at which point the received operation key status data transitions from "1" to "0"), and performs game processing for causing a jump of character A in the game in accordance with the extracted trigger information.

Now, a case will be considered in which the communication at communication timing point t4 is prevented from occurring or fails to occur for some reason. In this case, according to commonly-used methods that are based on the exchange of trigger information, the trigger information "J" fails to be transmitted to the other game machines, so that the processing for causing a jump of character A in the game does not occur. In contrast, according to the preferred embodiment example method which involves the exchange of operation key status data, although the operation key status data "0" is not transmitted to the other game machines at communication timing point t4, the other game machines can still detect a transition of the operation key status data from "1" to "0" at communication timing point t5. As a result, the trigger information indicating that "character A jumps" is safely extracted at this point, whereby the game processing for causing a jump of character A can properly take place.

Thus, even if any data that needs to be exchanged between the game machines fails to be communicated, whether accidentally or on purpose, the influence thereof can be minimized because the preferred illustrative embodiment method works based on the exchange of operation key status data between the game machines. This principle enables data processing as described later.

(Example Communication Processing)

The communication methodology between the game machines will be first described, followed by a more detailed description of the operations of the game machines 100a to 100d. The present embodiment of the invention illustrates an exemplary case where the parent machine 100a plays a main role in the communications occurring among the game machines. Specifically, the parent machine 100a initiates communication in synchronization with the beginning (hereinafter referred to as the "start point") of a vertical blanking period (hereinafter referred to as a "V blanking period") of the parent machine 100a. Once communication is begun, the operation key status data associated with the parent machine 100a, which is stored in the Out area 31a of the communication data buffer 30a of the parent machine 100a, is outputted to the communication cable 200 via the communication terminal 40. The operation key status data associated with the parent machine 100a is stored in the In areas 32a to 32d of the communication data buffers 30a to 30d of all of the game machines 100a to 100d which are coupled to the communication cable 200.

Once the data transmission from the parent machine 100a is completed, then a data transmission from the daughter machine 100b is begun. As in the case of the data transmission from the parent machine 100a, the operation key status data associated with the daughter machine 100b, which is stored in the Out area 31b of the daughter machine 100b, is transmitted so as to be stored in the respective In areas 32a to 32d of all of the game machines 100a to 100d as an appendage to the operation key status data associated with the parent machine 100a, which has already been stored therein. Thereafter, the data transmission from the daughter machine 100c and the daughter machine 100d sequentially occurs in a similar manner.

Thus, when the transmission of the operation key status data associated with all of the game machines 100a to 100d is completed, the operation key status data associated with all of the game machines 100a to 100d are ready in the In areas 32a to 32d of the game machines 100a to 10d.

When one round of data communication is completed in the aforementioned manner, post-communicational interrupt handling (hereinafter referred to as "SIO interrupt handling"; described in more detail later) is necessitated in the respective game machines 100a to 100d. In the SIO interrupt handling, the writing and reading of operation key status data to and from the communication data buffer 30 is performed.

(Example of How Operation Key Status Data are Utilized in the Respective Game Machines)

As described above, when every round of data communication is completed, SIO interrupt handling is necessitated in each game apparatus. In the SIO interrupt handling, the operation key status data associated with all of the game machines 100a to 100d which are stored in the In area 32 of the communication data buffer 30 are transferred to the received data buffer 50, which is a FIFO buffer in the example embodiment. The operation key status data which have been transferred to the received data buffer 50 are transferred further to the operation data buffer 60 in accordance with predetermined timing. However, this transfer occurs in such a manner that only the operation key status data to be used for the actual game processing will be transferred, while discarding any data which is not to be used for the game processing. Hereinafter, this transfer process will be described in two illustrative examples.

Figure 5:
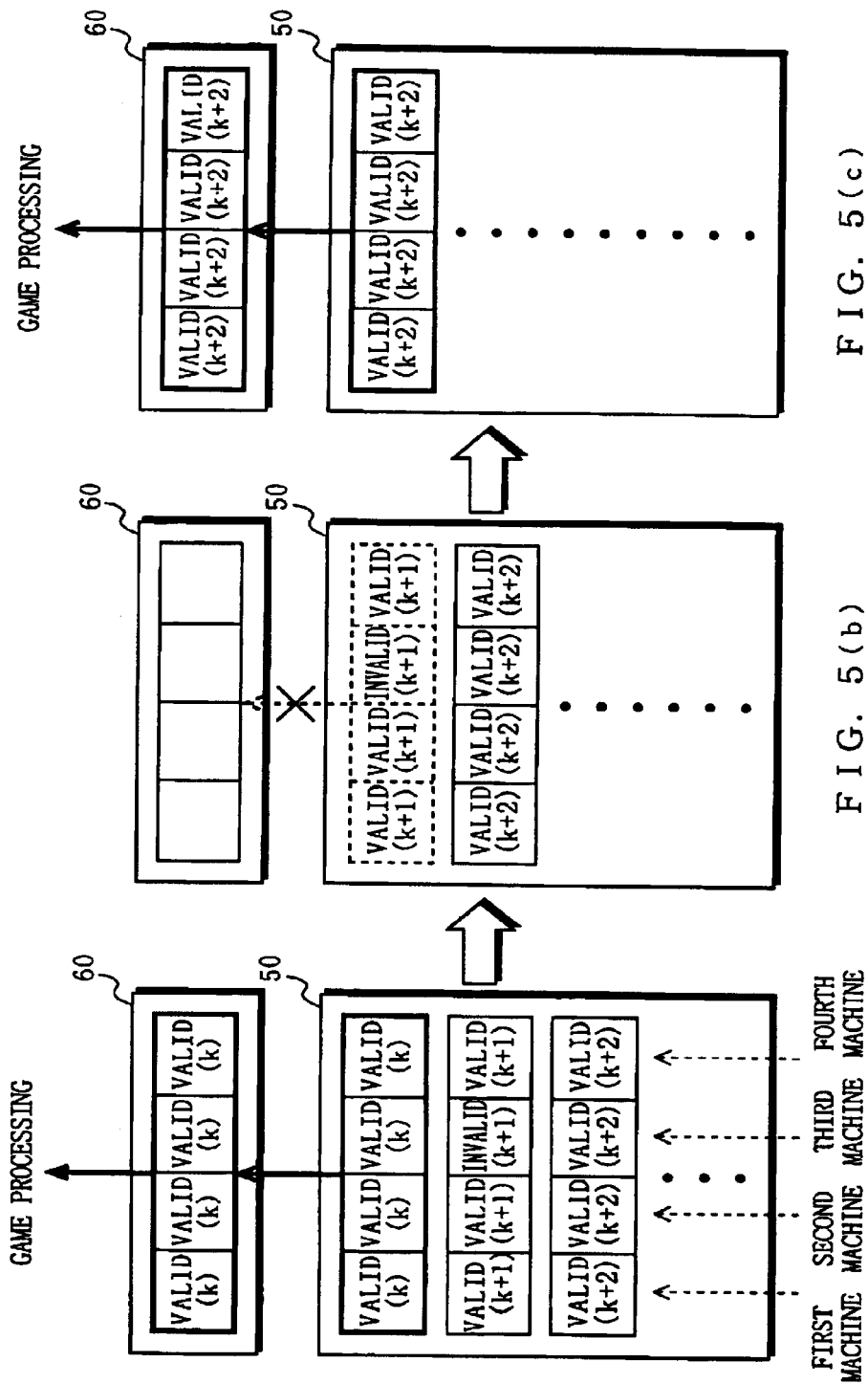
FIG. 5 is a set of diagrams ((a), (b), (c)) illustrating an exemplary first example transfer process from a received data buffer 50 to an operation data buffer.
Figure 6:
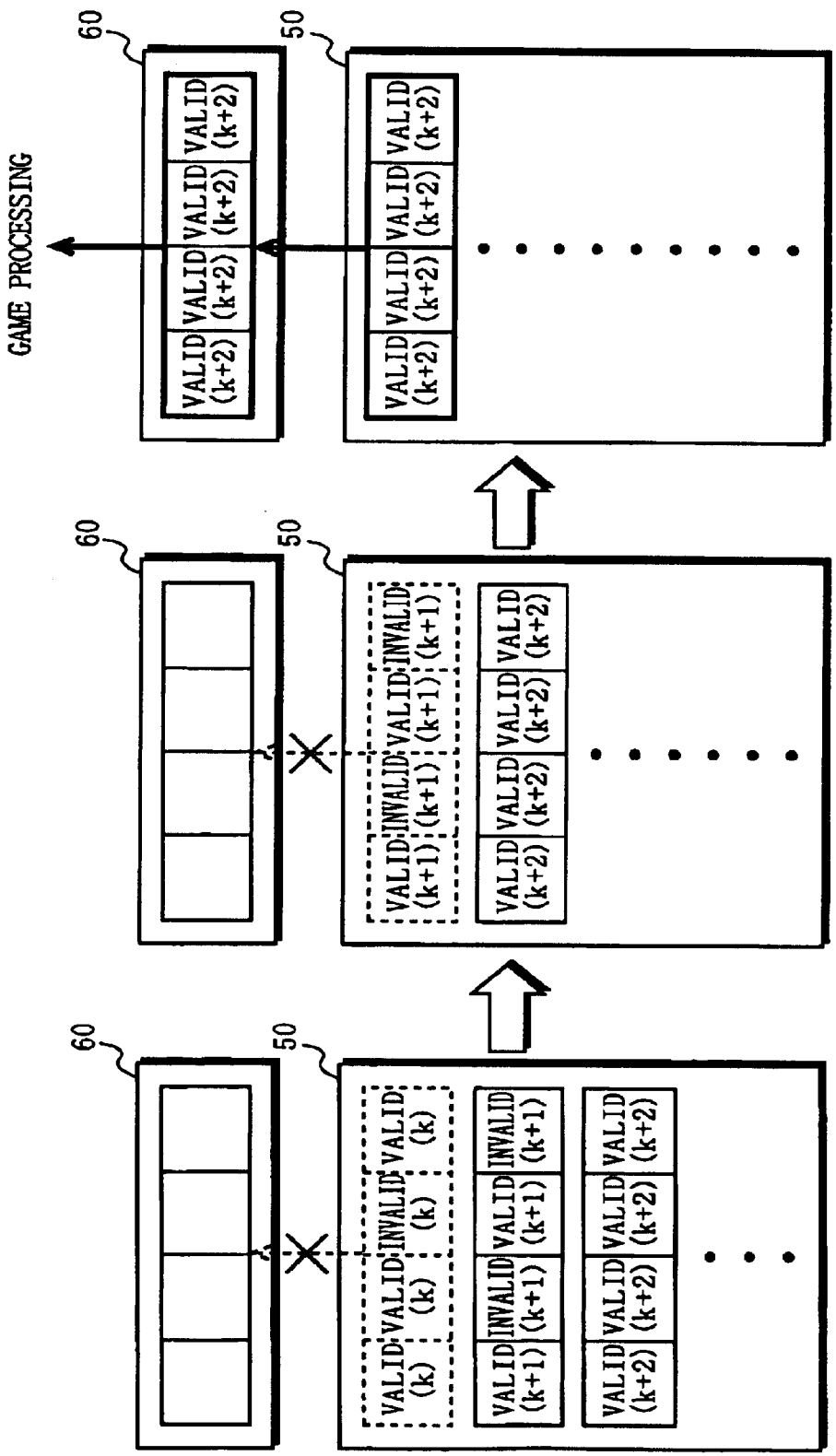
FIG. 6 is a set of diagrams ((a), (b), (c)) illustrating the first example transfer process from the received data buffer 50 to the operation data

First, with reference to FIGS. 5 and 6, a first example transfer process will be described. For every round of data communication performed, the operation key status data associated with all of the game machines 100a to 100d are sequentially stored in the data buffer 50 in the SIO interrupt handling. For example, as shown in (a) of FIG. 5, the operation key status data which are respectively received at the $k^{th}$ to $k+2^{th}$ data communication timing points may be stored in the received data buffer 50. The received data which are stored in the received data buffer 50 are transferred to the operation data buffer 60 on a first-stored-first-out basis. Prior to the transfer, however, it is determined whether or not the operation key status data associated with each game machine is valid data. As shown in (a) of FIG. 5, if the operation key status data associated with all (i.e., first to fourth) game machines 100a to 100d are valid, the current set of operation key status data are transferred to the operation data buffer 60; thereafter, game processing is performed on the basis of the transferred operation key status data. On the other hand, as shown in (b) of FIG. 5, if at least one of the operation key status data associated with all (i.e., first to fourth) game machines 100a to 100d is invalid, the current set of operation key status data associated with all of the game machines are discarded without being transferred, so that the corresponding game processing does not occur. Similarly, as illustrated in (a), (b), and (c) of FIG. 6, if any invalid data are contained for a number of rounds of data communication, the associated number of sets of operation key status data are sequentially discarded. Although the invalid data are illustrated as being "discarded", it is only necessary to ensure that such invalid data are never used for the game; for example, the system may be arranged so that some other special data is transferred in the place of any invalid data.

As used herein, "invalid data" refers to any data other than the valid data; that is, "invalid data" refers to any data other than the operation key status data which would normally be transmitted from each game machine 100. Invalid data may include, for example, data resulting from a hardware-related error, and delayed processing notice data (described later) which is transmitted as special data in the case where the game machine 100 could not prepare valid operation key status data to send by the communication timing point.

Thus, according to the first example transfer process, a given set of operation key status data is used for the game processing only if all of the operation key status data in the set are valid (i.e., with respect to all of the game machines 100a to 100d). Therefore, if one of the game machines was unable to prepare transmission data by the data communication timing point due to delayed processing or the like, for example, it is still possible to prevent inconsistencies in game content or progression between different game machines because the data which are transmitted/received in that round of data communication are discarded in all of the game machines. As described above, since operation key status data, rather than trigger information, are exchanged as the transmission data according to the present exemplary embodiment of the invention, no substantial problem results from the aforementioned partial discarding of transmission data.

Next, with reference to FIG. 7, a second example transfer process will be described. According to the second example transfer process, as is the case with the first example transfer process, received data are transferred on a first-stored-first-out basis, and the validity of the operation key status data associated with each game machine is determined prior to the transfer. However, the second example transfer process differs from the first example transfer process in the following aspect. As shown in (a) of FIG. 7, if any valid operation key status data exists in addition to invalid data, only the valid data is individually transferred to the operation data buffer 60, followed by a next transfer of operation key status data. During the next transfer of operation key status data, as shown in (b) of FIG. 7, only the operation key status data associated with the game machines which have not yet transferred valid operation key status data are transferred. As shown in (c) of FIG. 7, once the valid operation key status data associated with all of the game machines 100a to 100d are stored in the operation data buffer 60 through a number of such transfers, game processing is performed based on these operation key status data.

Figure 7:
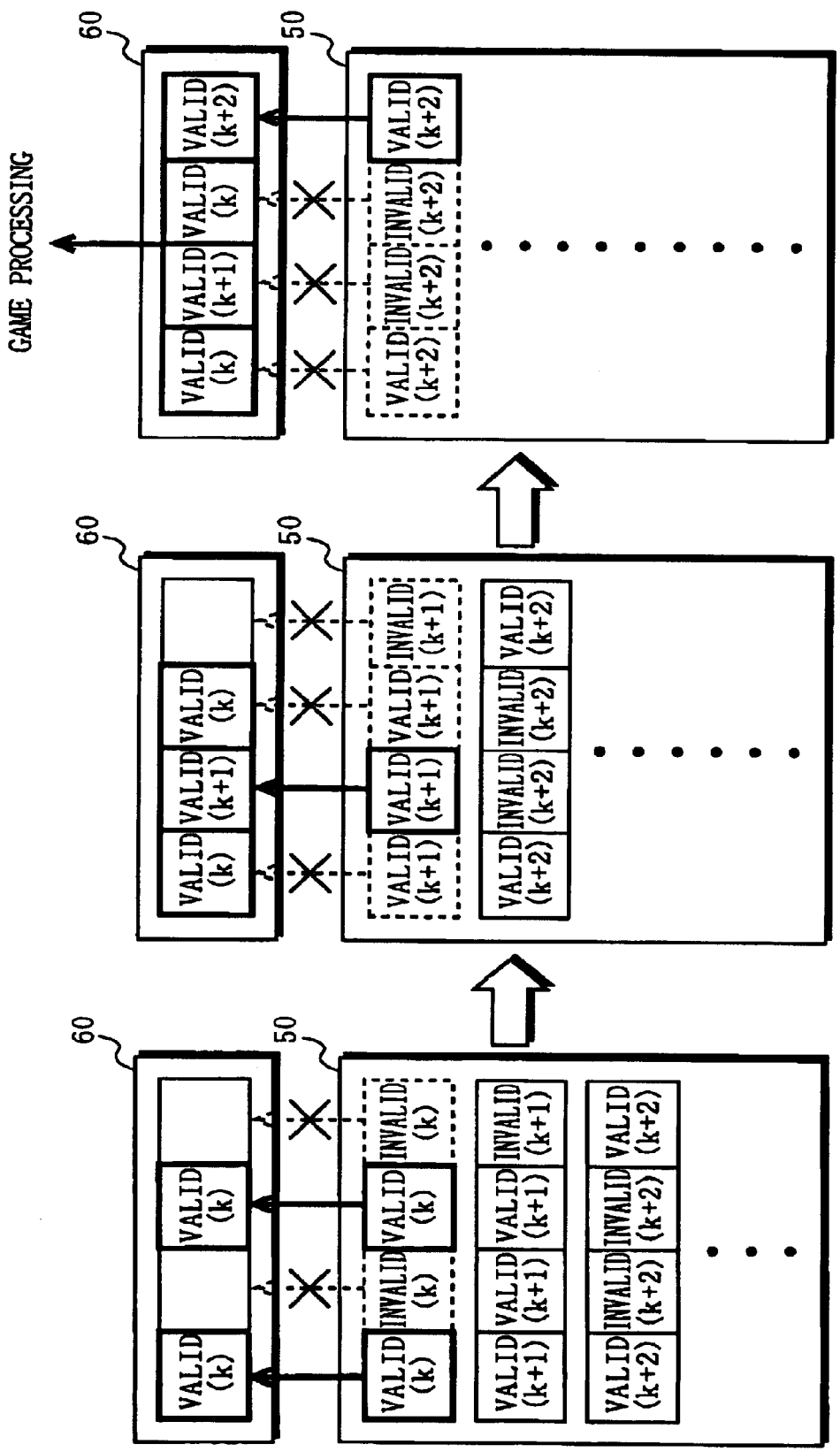
FIG. 7 is a set of diagrams ((a), (b), (c)) illustrating the first example transfer process from the received data buffer 50 to the operation data buffer.

In contrast, in the first example transfer process, the game processing does not occur in response to the received data as shown in (a), (b), and (c) of FIG. 7 being stored in the received data buffer 50 because the data received in these three rounds of communication all include invalid data.

Thus, according to the second example transfer process, even if invalid data is included in the data received in a given round of communication, the remainder of the data (i.e., the valid operation key status data) are utilized rather than being discarded. Therefore, it is possible to perform game processing as soon as at least one valid operation key status data has been received from every one of the game machines, without having to wait for a future round of communication in which the operation key status data associated with all of the game machines may be valid. Accordingly, in addition to the ability to prevent inconsistencies in game content or progression between different game machines as obtained in the case of the first example transfer process, it is also possible to minimize the delay in the processing. As shown in (a) to (c) of FIG. 7, for example, the delay in the processing can be minimized even if four game machines 100a to 100d alternately transmit invalid data. As a result, a more efficient data transfer process than that obtained with the first example transfer process can be realized.

The present invention is not limited to the two particular examples of transfer processes described above. Those skilled in the art would be able to conceive various modifications which ensure that at least one operation key status data for each game machine is transferred through a number of rounds of data communication.

(Example CPU Processing)

Hereinafter, with reference to the flowcharts shown in FIG. 8 to FIG. 12, example illustrative operation of the CPU 70 of the game machine 100 in the on-line game system according to the present embodiment of the invention will be described. The transfer process according to the present embodiment of the invention will be performed in accordance with the above-described second example transfer process, which is generally more preferable in at least certain circumstances to the first example transfer process. It is assumed that the operation of the CPU 70 described below will be executed in accordance with a game program which is stored in the external storage medium 80 such as a ROM cartridge.

Figure 8:
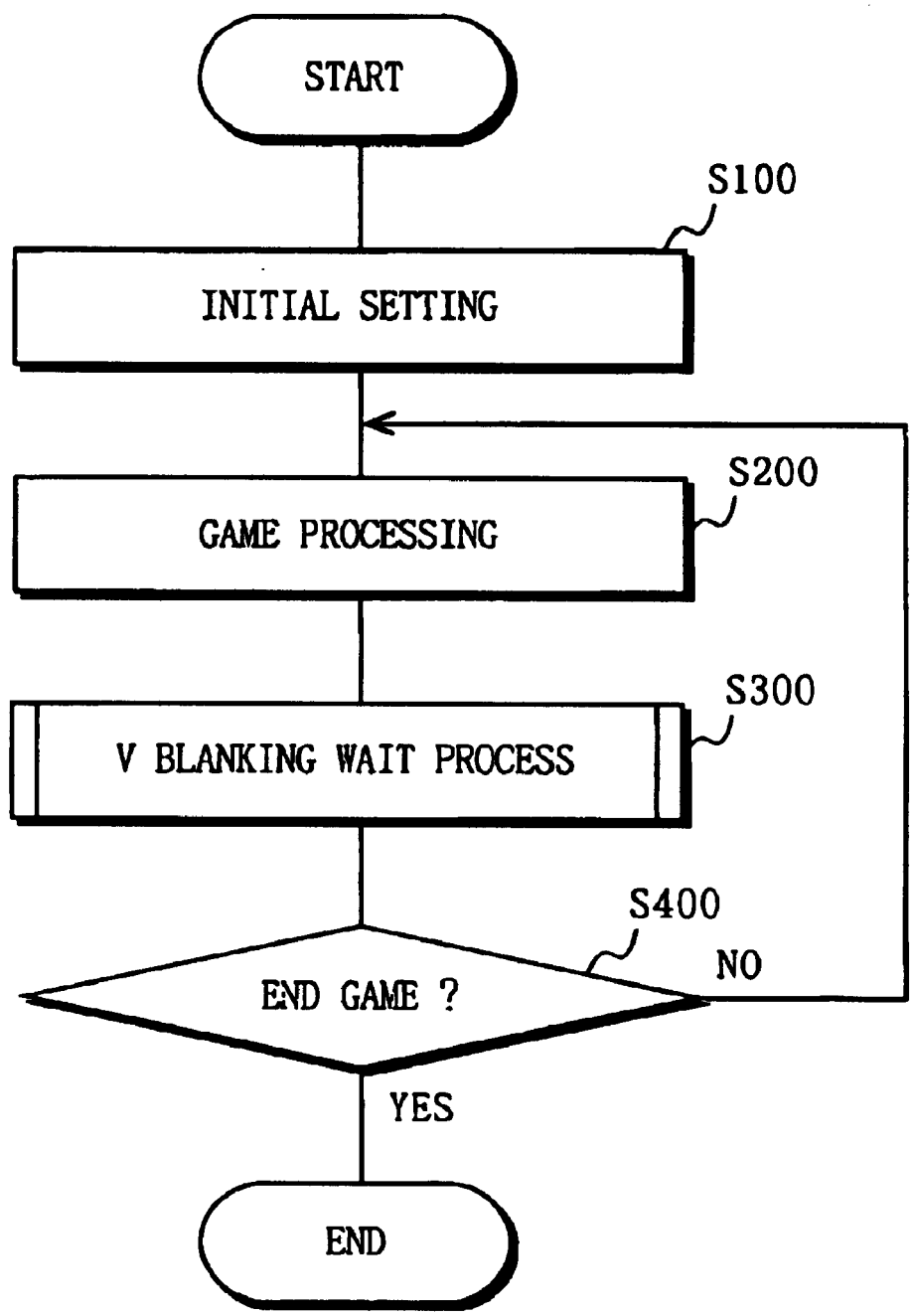
FIG. 8 is a flowchart illustrating an exemplary main operation of a CPU 70.

As shown in FIG. 8, as the game program is started, the CPU 70 establishes initial settings (S100) and then proceeds to game processing (S200). The game processing basically consists of a process which is performed within one frame (1/60 seconds). Once the game processing is completed, a V blanking wait process is observed (S300). During the V blanking wait process, predetermined processing is performed after awaiting the beginning of a V blanking period, which occurs periodically with a cycle time of 1/60 seconds. The detailed processing during the V blanking wait process will be described later. After the V blanking wait process is completed, it is determined whether or not to terminate the game (S400). If the game is to continue, the process returns to Step S200. If the game is not to continue, the process is terminated.

In other words, the illustrative processing by the CPU 70 involves: awaiting the beginning of a V blanking period to perform predetermined processing associated with the V blanking wait process; performing game processing; and thereafter awaiting another V blanking period.

Each of the game machines 100a to 100d operates in accordance with the flowchart shown in FIG. 8. In addition, V blank interrupt handling and SIO interrupt handling (both of which will be described in more detail later) are necessitated at the start point of each V blanking period and the end point of each round of data communication, respectively.

Figure 9:
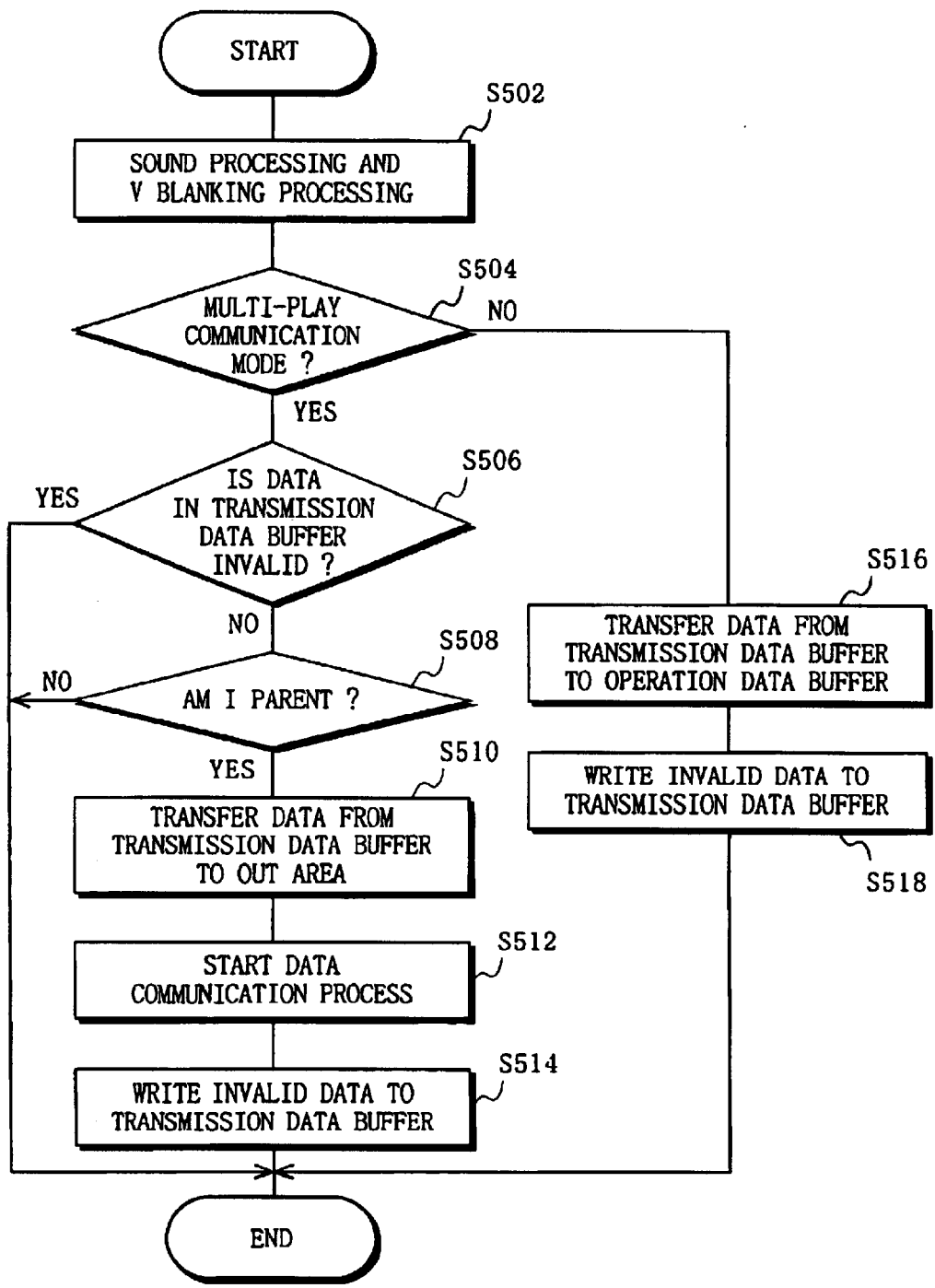
FIG. 9 is a flowchart illustrating an exemplary operation of the CPU 70 during V blank interrupt handling.

With reference to FIG. 9, the V blank interrupt handling will be described. During the V blank interrupt handling, the CPU 70 first deals with sound processing and V blanking processing as are commonly practiced in game apparatuses in general (S502). Then, a multi-play communication mode is detected (S504). If a multi-play communication mode is detected, then it is determined whether the data which is stored in the transmission data buffer 20 is invalid or not (S506), and it is determined whether the game machine is a parent machine or not (S508). If the game machine is a parent machine and if the data stored in the transmission data buffer 20 is valid operation key status data, then the process proceeds to Step S510. Otherwise, the V blank interrupt handling ends.

At Step S510, the valid operation key status data which is stored in the transmission data buffer 20a is transferred to the Out area 31 of the communication data buffer 30a. Then, a data communication process among the game machines 100a to 100d is started (S512). Thereafter, invalid data is written to the transmission data buffer 20a (S514), and the V blank interrupt handling ends.

On the other hand, if a multi-play communication mode is not detected at Step S504, the valid operation key status data which is stored in the transmission data buffer 20 is transferred to the operation data buffer (S516). Thereafter, invalid data is written to the transmission data buffer 20 (S518), and the V blank interrupt handling ends.

As described above, during the V blank interrupt handling, processing which is required for the parent machine 100a to begin data communication is performed. In other words, data communication occurs at the start point of a V blanking period for the parent machine 100a.

Although the parent machine 100a is illustrated as beginning data communication at the start point of a V blanking period for the parent machine 100a in the present embodiment of the invention, the data communication may be begun at any other point in time. Furthermore, a device having the ability to control data communication may be separately provided to control the starting of data communication.

Figure 10:
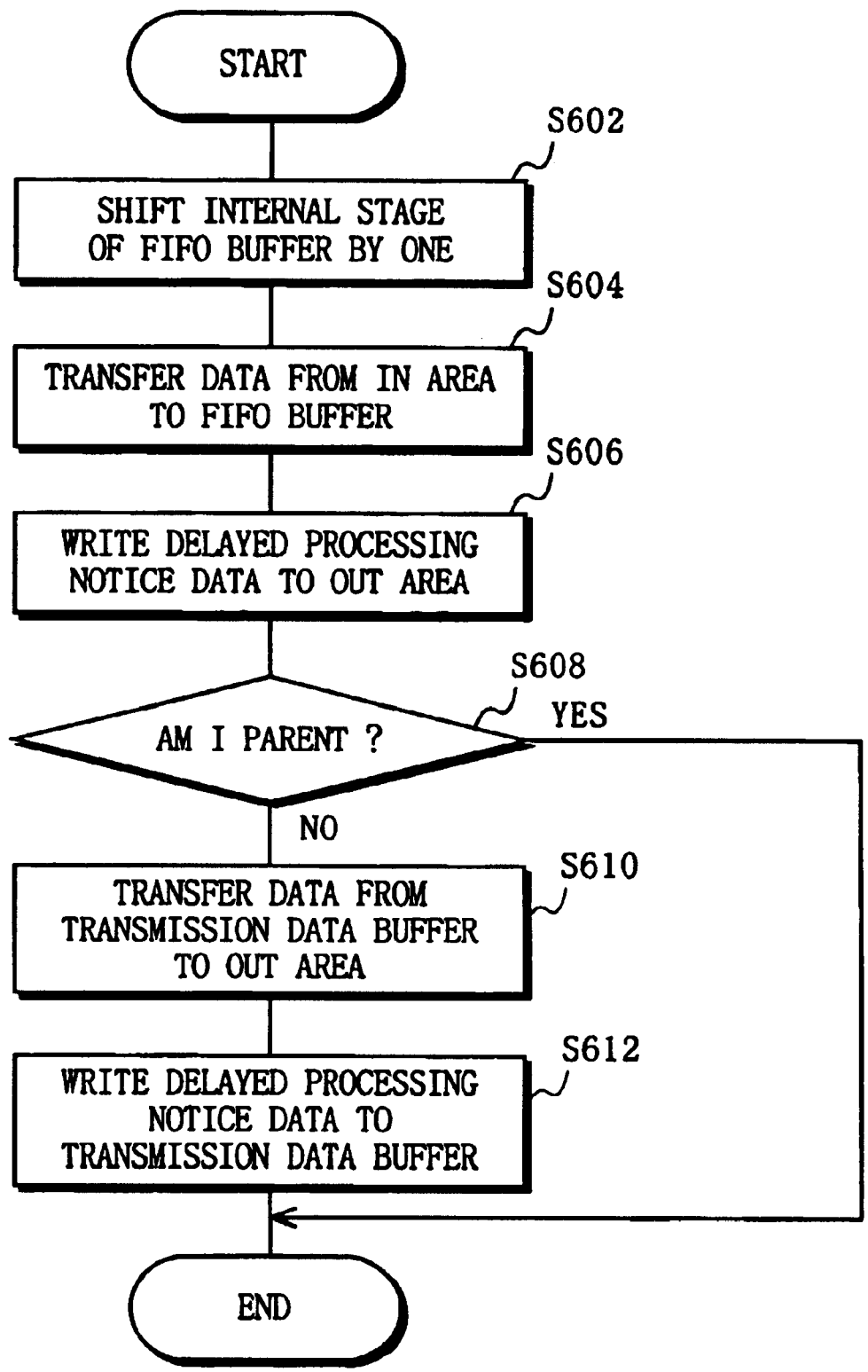
FIG. 10 is a flowchart illustrating an exemplary operation of the CPU 70 during SIO interrupt handling.

Next, with reference to FIG. 10, SIO interrupt handling will be described. The SIO interrupt handling is an interrupt handling which is necessitated in each of the game machines 100a to 100d when the data communication which was begun by the parent machine 100a is completed as described above.

During the SIO interrupt handling, the CPU 70 first shifts the internal stage of the received data buffer (FIFO buffer) 50 by one (S602), and transfers to the received data buffer 50 the data which was stored in the In area 32 of the communication data buffer 30 during the data communication which took place immediately before the occurrence of the SIO interrupt (S604). Then, delayed processing notice data, e.g., "3FFF" in hexadecimal expression is written to the Out area 31 of the communication data buffer 30 (S606). Thereafter, it is determined whether the game machine is a parent machine (S608). If the game machine is a parent machine, the SIO interrupt handling ends. If the game machine is a non-parent machine, i.e., a daughter machine, then the data stored in the transmission data buffer 20 is transferred to the Out area 31 of the communication data buffer 30 (S610), and thereafter the delayed processing notice data is written to the transmission data buffer 20 (S612) and the SIO interrupt handling ends.

As described above, during the SIO interrupt handling, a process of reading from the communication data buffer 20 the data which was received through the immediately preceding round of data communication and a process of writing the data to be transmitted through a next round of data communication to the communication data buffer 20 are performed.

The writing of data to the communication data buffer 20 and the reading of data from the communication data buffer 20 may be performed at any other points in time. However, in order to prevent hardware-related errors which might occur when data read/write for the communication data buffer 20 occurs concurrently with data communication, it is preferable to data read/write for the communication data buffer 20 immediately after the completion of data communication, as in the present embodiment of the invention.

Thus, according to the present embodiment of the invention, in response to the start point of a V blanking period for the parent machine 100a, data communication is begun by the parent machine 100a during V blank interrupt handling. After the data communication is completed, the received data is transferred to the received data buffer 50 in each of the game machine 100a to 100b. As described above, the received data buffer 50 is a so-called FIFO buffer capable of storing a plurality of data on a first-in-first-out basis, and allows the received data to be stored in the received data buffer 50 in a sequential order.

The received data stored in the received data buffer 50 is utilized in such a manner that only the valid operation key status data are transferred to the operation data buffer 60 through predetermined transfer processes for use in the game processing, as described above. Such transfer processes occur during the V blanking wait process described at Step S300 in FIG. 8.

Figure 11:
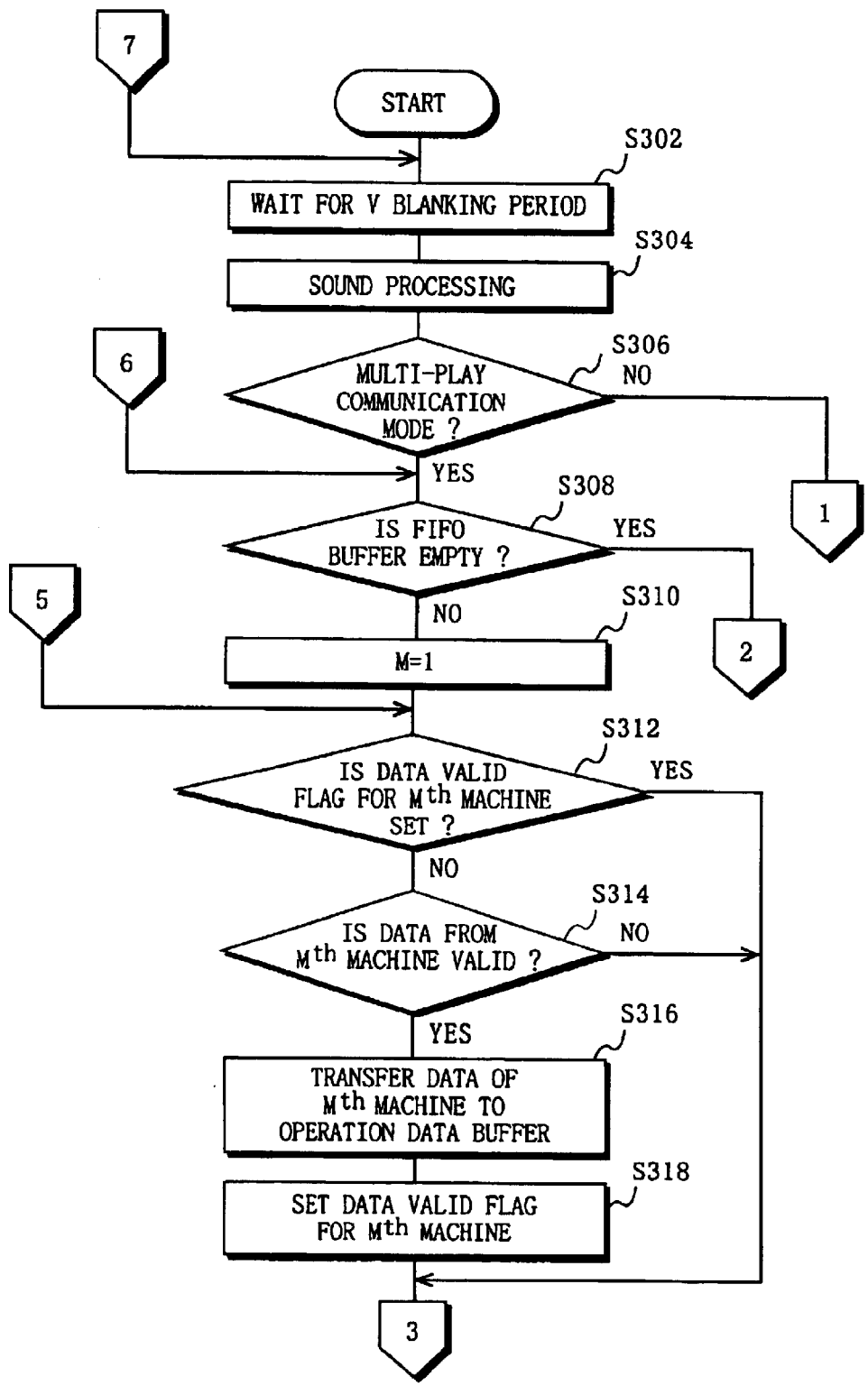
FIG. 11 is a partial flowchart illustrating a portion of an exemplary operation of the CPU 70 during V blanking wait process.
Figure 12:
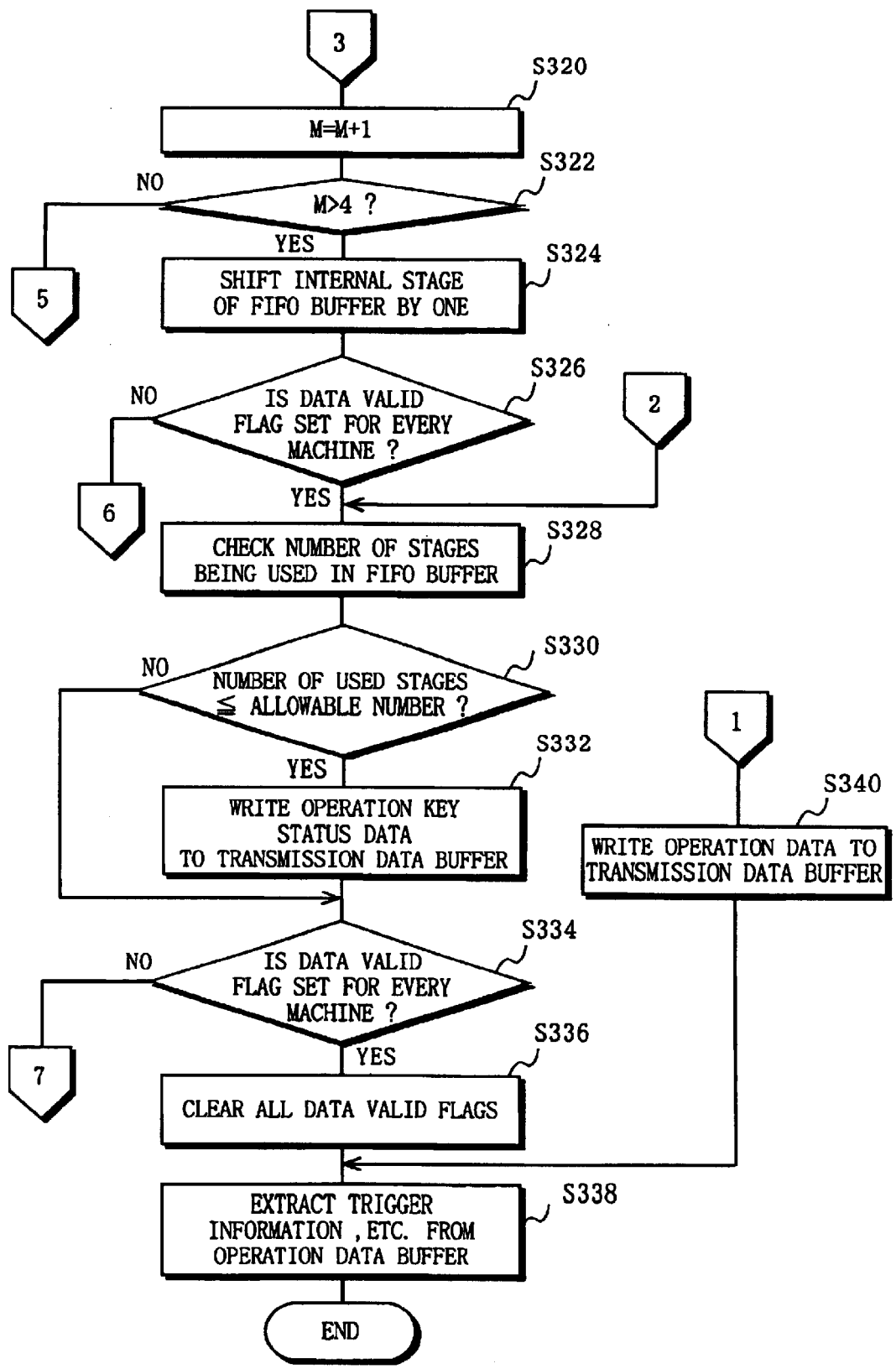
FIG. 12 is a partial flowchart following FIG. 11, illustrating a further portion of an exemplary operation of the CPU 70 during V blanking wait process.

Hereinafter, the V blanking wait process will be described with reference to a series of flowcharts shown in FIGS. 11 and 12. In the V blanking wait process, the CPU 70 first awaits a V blanking period (S302). Once a V blanking period begins, general sound processing is performed (S304), and then a multi-play communication mode is detected (S306). If a multi-play communication mode is detected, the process proceeds to Step S308. If a multi-play communication mode is not detected, the process proceeds to Step S340. At Step S308, it is determined whether or not the received data buffer (FIFO buffer) 50 is empty. If the received data buffer is empty, the process proceeds to Step S328, S330. If the received data buffer is not empty, the process proceeds to Step 5310 to transfer valid operation key status data from the received data buffer 50 to the operation data buffer 60.

At Step S310, a variable M to serve as an identification number of each game machine is set to "1" in preparation for sequentially determining (beginning from the first machine) whether the received data from each of the game machines 100a to 100d which are stored at the beginning of the received data buffer 50 should be transferred to the operation data buffer 60 or not. Then, it is determined whether a "data valid" flag for an M$^{th}$ machine has already been set or not (S312). If a data valid flag has already been set, the process proceeds to Step S320. The data valid flag is a flag which indicates whether or not valid operation key status data has already been transferred to the operation data buffer 60. On the other hand, if a data valid flag has not been set for the M$^{th}$ machine yet, then the received data from the M$^{th}$ machine among the received data which are stored at the beginning of the received data buffer 50 is valid operation key status data or not (S314). If this data is not valid operation key status data, i.e., if it is invalid data, the process proceeds to Step S320. On the other hand, if this data is valid operation key status data, the data is transferred to the operation data buffer 60 (S316), and a data valid flag for the M$^{th}$ machine is set (S318). Thereafter, the process proceeds to Step S320.

At Step S320, the variable M is incremented in order to determine whether or not the received data from the next game machine after the M$^{th}$ machine (i.e., the M$^{+1}$th machine) should be transferred or not (S320). At Step 322, it is determined whether or not the variable M has exceeded the number (i.e., four in this exemplary case) of game machines which are together engaged in a multi-play communication mode. If it is confirmed at Step 322 that the variable M has not exceeded four, the process returns to Step S312. On the other hand, if it is determined at Step 322 that the variable M has exceeded four, the process proceeds to Step S324.

At Step S324, since the determination as to whether or not to transfer the received data stored at the beginning of the received data buffer 50 has been completed for the received data from all of the game machines 100a to 100d, the internal stage of the received data buffer 50 is shifted by one. Then, it is determined whether or not a data valid flag has been set for all of the game machines 100a to 100d (S326). If a data valid flag has been set for all of the game machines 100a to 100d, the process proceeds to Step S330 to perform game processing based on the operation key status data associated with the game machines 100a to 100d which have been transferred to the operation data buffer 60. On the other hand, if a data valid flag has not been set for at least one of the game machines 100a to 100d, the process returns to Step S308 to determine whether or not to transfer the new received data which has been shifted to the beginning of the received data buffer 50, in order to eventually allow the operation key status data associated with all of the game machines 100a to 100d to be transferred to the operation data buffer 60.

If it is determined at Step S326 that a data valid flag has been set for every one of the game machines 100a to 100d, or if it is determined at Step S308 that there is no received data stored in the received data buffer 50, then the process proceeds to Step S328.

At Step S328, the number of stages being used in the received data buffer 328 is checked to determine whether or not the number of used stages is equal to or less than a predetermined number (e.g., two; hereinafter referred to as the "allowable number of stages") (S330). If the number of used stages is equal to or less than the allowable number of stages, the operation key status data is written to the transmission data buffer 20 (S332), and thereafter the process proceeds to Step S334. If the number of used stages has exceeded the allowable number of stages, the process directly proceeds to Step S334. This determination is made in order to ensure that one or more game machines which are suffering from delayed processing temporarily refrain from transmitting valid operation key status data (i.e., by continuously transmitting invalid data), while the other game machines wait for the one more game machines to restore normal operation from the delayed state.

At Step S334, it is determined whether or not a data valid flag has been set for every one of the game machines 100a to 100d. If a data valid flag has been set for every one of the game machines 100a to 100d, the process proceeds to Step S336. On the other hand, if a data valid flag has not been set for at least one of the game machines 100a to 100d, the process return to Step S302 to wait for a next V blanking period. At Step S336, the data valid flags for all of the game machines 100a to 100d are cleared, and thereafter, trigger information and the like are extracted from the operation key status data associated with each of the game machines 100a to 100d stored in the operation data buffer 60 (S338), and the V blanking wait process is terminated.

If a multi-play communication mode is not detected at Step S306, the operation key status data is written to the transmission data buffer 20 (S340), and trigger information and the like are extracted from the operation key status data stored in the operation data buffer 60 (S338), and the V blanking wait process is terminated.

As described above, according to the present embodiment of the invention, delayed processing notice data is temporarily written to the transmission data buffer 20 (Step S612 in FIG. 10) after the data communication for the transmission data is completed. The transmission data buffer 20 is overwritten by the valid data only when any valid operation key status data to be transmitted becomes ready (Step S332 in FIG. 12). Accordingly, if valid operation key status data cannot be prepared within the period between a given round of data communication and a next round of data communication due to delayed game processing or the like, the delayed processing notice data is transmitted to the other game machines.

Each of the game machines 100a to 100d performs game processing based on those data (S334) only when the valid operation key status data associated with all of the game machines have become ready. Accordingly, even if one of the game machines suffers from delayed processing, none of the game machines 100*a* to 100*d* performs game processing until valid operation key status data is transmitted from that game machine. As a result, it is ensured that there are no inconsistencies in game content between different game machines.

(Example Possible Causes for Delayed Processing)

Next, causes for delayed processing, i.e., inability to prepare any valid operation key status data for transmission within the period between a given round of data communication and a next round of data communication, will be described with reference to the figures.

There are two primary causes for delayed processing. One is a delay in the game processing itself. The other is a difference between the data communication cycle and the cycle of V blanking periods. First, with reference to a timing diagram shown in FIG. 13, an ideal operation state in which there is no delay in the processing will be described; then, the aforementioned two primary causes for delayed processing will be described. FIG. 13 illustrates data transfer timing and data flow in a given daughter machine operating in an ideal state, where the cycle of the V blanking periods of the parent machine completely coincides with the cycle of the V blanking periods of the daughter machine.

In FIG. 13, it is assumed that the daughter machine is alternately performing game processing and V blanking wait processes in accordance with the flowchart shown in FIG. 8. During the respective V blanking wait processes, the daughter machine waits for the start points (s1, s2, s3, and s4) of its own V blanking periods before writing operation key status data "A" to "F" to the transmission data buffer, respectively. For example, the operation key status data "C" is written to the transmission data buffer 20 at start point s1.

On the other hand, data communication occurs independently of the processing timing of the daughter machine. Specifically, each round of data communication occurs at the start point of a V blanking period for the parent machine. Communication timing points t1 to t5 correspond to the start points of different V blanking periods for the parent machine. At respective communication timing points t1 to t5, the data which is stored in the Out area 31 is transmitted; the data stored in the transmission data buffer 20 is transmitted to the Out area 31 during the SIO interrupt handling following the data communication; and delayed processing notice data "delayed" (indicated as "DL" in FIG. 13) is written to the transmission data buffer 20. For example, at communication timing point t2, the operation key status data "B" which was written to the Out area 31 at communication timing point t1 is transmitted as the transmission data during the data communication; and during the SIO interrupt handling following the data communication, the operation key status data "C" which was written to the transmission data buffer 20 at point s1 is transferred to the Out area 31. Thereafter, the delayed processing notice data "delayed" is written to the transmission data buffer 20.

In this case, as shown in FIG. 13, the game processing which follows the V blanking wait process will surely have been completed before the start point of the next V blanking period, and the delayed processing notice data "delayed" which was written to the transmission data buffer 20 during the SIO interrupt handling will surely have been overwritten by the operation key status data "A" to "F" before the next communication timing point. For example, the delayed processing notice data "delayed" which was written to the transmission data buffer 20 at communication timing point t1 is overwritten by operation key status data "C" at point s1. As a result, the delayed processing notice data "delayed" is not transferred to the Out area 31, and the delayed processing notice data "delayed" is not transmitted to the other game machines. Next, with reference to FIG. 14, a case will be described where delayed processing notice data is transmitted as a result of delayed game processing. In this case, too, it is assumed that the cycle of the V blanking periods of the parent machine (and hence the data communication cycle) completely coincides with the cycle of the V blanking periods of the daughter machine. However, the game processing which was performed after start point s2 of a V blanking period has not completed at start point s3 of the next V blanking period. Therefore, the operation key status data is not written to the transmission data buffer 20 at point s3. At communication timing point t4, the delayed processing notice data "delayed" (indicated as "DL" in FIG. 14) is transferred to the Out area 31, which will later be transmitted at communication timing point t5.

Thus, even in an ideal situation where the cycle of the communication timing and the cycle of the V blanking periods completely coincide, it may be impossible to prepare any valid data for transmission within the period between a given round of data communication and a next round of data communication for reasons such as delayed game processing.

Next, with reference to FIG. 15, a case will be described where a difference between the data communication cycle and the cycle of the V blanking periods causes delayed processing notice data to be transmitted. In this case, the game processing which is performed at each of points s1 to s3 is completed before a subsequent V blanking period start point. In other words, there is no delay in the game processing. However, due to the difference between the cycle of communication timing and the cycle of the start points of the V blanking periods, there is no V blanking period start point between communication timing point t3 and communication timing point t4, for example. Therefore, operation key status data is not written to the transmission data buffer 20 during the period between communication timing point t3 and communication timing point t4. At communication timing point t4, delayed processing notice data "delayed" (indicated as "DL" in FIG. 15) is transferred to the Out area 31, which will later be transmitted at communication timing point t5.

Thus, in the case where the data communication cycle and the cycle of the V blanking periods do not completely coincide, it may be impossible, even in the absence of delayed game processing, to prepare any data for transmission within the period between a given round of data communication and a next round of data communication.

As described above, according to the present embodiment of the invention, inconsistencies in game content between different game machines are prevented through software-based synchronization which does not require hardware-based synchronization, even in the case where each game machine is operating in a non-synchronous manner with respect to the communication timing or where there is delay in the game processing.

Although a plurality of game machines 100*a* to 100*d* are interconnected via the communication cable 200 according to the present embodiment of the invention, the present invention is not limited to such a configuration. For example, a plurality of computer terminals which operate in accordance with a game program may be coupled to a network, and data communication among the terminals may occur over the network. Alternatively, the communication among the game machines may occur in a wireless manner.

Although the various operations according to the present embodiment of the invention are described as being executed by the CPU 70 in accordance with a game program which is stored in the external ROM cartridge 80, the present invention is not limited to such a configuration. For example, the game program may be stored in the game machine itself, and/or part of the operation thereof may be implemented in hardware. When a plurality of game machines process a game which is directed to the same content, an external ROM cartridge 80 may be inserted in each game machine or only one of the game machines so long as the game is fully playable to all participants. Also, any sort of a storage medium (e.g., optical or magnetic disk) can be used to store the game program.

While the invention has been described in detail, the foregoing description is in all aspects illustrative and not restrictive. It is understood that numerous other modifications and variations can be devised without departing from the scope of the invention.

What is claimed is:

1. An on-line game system comprising a plurality of interconnected game devices to allow a plurality of users to simultaneously play the same game, wherein each of the plurality of game devices comprises:

at least one operation control manipulable by a user;

a communication arrangement allowing the game device to be coupled to the other game device(s) and receive and transmit operation control status data representing a state of the at least one operation control;

a buffer storage that sequentially stores operation control status data associated with the plurality of game devices in response to a round of data communication therebetween; and an operation data storage that stores operation control status data associated with each of the plurality of game apparatuses, the operation control status data being used with game processing, wherein, when the operation control status data stored in the buffer storage as a result of a particular round of data communication include valid operation key status data and invalid data, and the invalid operation control status data among the operation control status data resulting from a plurality of rounds of data communication including the particular round are not effectively transferred to the operation data storage, so that at least one such valid operation key status data is transferred for each of the plurality of game devices, and upon a subsequent round of data communication, a valid operation key status data is generated for the game device that generated an invalid operation key status data resulting from a plurality of previous rounds of communication so that at least one such valid operation key status data for each of the plurality of game devices is transferred to the operation data storage for game processing.

2. The on-line game system according to claim 1, wherein:

when the operation control status data stored in the buffer storage as a result of the particular round of data communication include invalid data, none of the operation control status data resulting from the given round of data communication is transferred; and when all of the operation control status data resulting from the particular round of data communication are valid, all of the operation control status data resulting from the given round of data communication are transferred.

3. The on-line game system according to claim 1, wherein:

when the operation control status data stored in the buffer storage as a result of the particular round of data communication include valid operation control status data and invalid data, only the valid operation control status data are transferred to the operation data storage, so that one valid operation control status data is transferred for each of the plurality of game devices, wherein the one valid operation control status data for each game device is an earliest valid operation control status data among the operation control status data resulting from a plurality of rounds of data communication including the given round.

4. The on-line game system according to claim 1, wherein the invalid data includes delayed processing notice data for notifying the other game device(s) of delayed processing.

5. The on-line game system according to claim 4, further comprising a transmission data buffer that temporarily stores data to be transmitted, wherein:

the delayed processing notice data is written to the transmission data buffer after the data is transferred out of the transmission data buffer; and thereafter, when the operation control status data is input to the transmission data buffer, the delayed processing notice data is overwritten by the operation control status data.

6. The on-line game system according to claim 1, wherein one of the plurality of game devices has a function of initiating data communication.

7. An on-line game system comprising a plurality of interconnected game devices to allow a plurality of users to simultaneously play the same game software program, wherein each of the plurality of game devices comprises:

at least one operation control for user manipulation;

a communication arrangement that couples the game devices to the other game device(s) to receive and transmit operation control status data representing a state of the at least one operation control;

a buffer storage that sequentially stores operation control status data associated with the plurality of game devices in response to a round of data communication;

an operation data storage that stores operation key status data associated with each of the plurality of game devices, the operation control status data being for use with game processing; and a transfer arrangement that transfers the operation control status data stored in the buffer storage to the operation data storage, wherein, when the operation control status data stored in the buffer storage as a result of a predetermined round of data communication include valid operation key status data and invalid data, the valid operation key status data among the operation key status data resulting from a plurality of rounds of data communication including the given round is transferred by the transfer arrangement to the operation data storage, without transferring at least some of the invalid data, so that at least one such valid operation control status data is transferred for each of the plurality of game devices.

8. A game apparatus for being interconnected to another game apparatus to allow a plurality of users to simultaneously play the same game software program, comprising:

at least one operation control for user manipulation;

a communication arrangement that couples the game apparatus to the other game apparatus and receives and transmits operation control status data representing a state of the at least one operation control;

a buffer storage that sequentially stores operation control status data associated with the plurality of game apparatuses in response to a round of data communication; and an operation data storage that stores operation control status data associated with each of the plurality of game apparatuses, the operation control status data being for use with game processing, wherein, when the operation control status data stored in the buffer storage as a result of a given round of data communication include valid operation control status data and invalid data, the valid operation control status data among the operation control status data resulting from a plurality of rounds of data communication including the given round are transferred to the operation data storage, without transferring at least some of the invalid data, so that at least one such valid operation control status data is transferred for each of the plurality of game apparatuses.

9. The game apparatus according to claim 8, wherein:

when the operation control status data stored in the buffer storage as a result of a given round of data communication include invalid data, none of the operation control status data resulting from the given round of data communication is transferred; and when all of the operation control status data resulting from the given round of data communication are valid, all of the operation control status data resulting from the given round of data communication are transferred.

10. The game apparatus according to claim 8, wherein:

when the operation control status data stored in the buffer storage as a result of a given round of data communication include valid operation control status data and invalid data, only the valid operation control status data are transferred to the operation data storage, so that one valid operation control status data is transferred for each of the plurality of game apparatuses, wherein the one valid operation control status data for each game apparatus is an earliest valid operation control status data among the operation control status data resulting from a plurality of rounds of data communication including the given round.

11. The game apparatus according to claim 8, wherein the invalid data includes delayed processing notice data for notifying the other game apparatus or game apparatuses of delayed processing.

12. The game apparatus according to claim 11, further comprising a transmission data buffer that temporarily stores data to be transmitted, wherein:

the delayed processing notice data is written to the transmission data buffer after the data is transferred out of the transmission data buffer; and thereafter, when the operation control status data is input to the transmission data buffer, the delayed processing notice data is overwritten by the operation control status data.

13. The game apparatus according to claim 8 having a function of initiating data communication.

14. A game apparatus for being interconnected to another game apparatus to be used in a plurality to allow a plurality of users to simultaneously play the same game software program, comprising:

at least one operation key for user manipulation;

a communication arrangement for coupling the game apparatus to the other game apparatus(es) to receive and transmit operation key status data representing a state of the at least one operation key;

a buffer storage for sequentially storing operation key status data associated with the plurality of game apparatuses in response to a round of data communication;

an operation data storage for storing operation key status data associated with each of the plurality of game apparatuses, the operation key status data being for use with game processing; and a transfer arrangement for transferring the operation key status data stored in the buffer storage to the operation data storage, wherein, when the operation key status data stored in the buffer storage as a result of a given round of data communication include valid operation key status data and invalid data, only the valid operation key status data among the operation key status data resulting from a plurality of rounds of data communication including the given round are transferred by the transfer means to the operation data storage, without transferring the invalid data, so that at least one such valid operation key status data is transferred for each of the plurality of game apparatuses.

15. A computer-readable storage device having stored therein a program for controlling a game device interconnected with at least one other game device to allow a plurality of users to simultaneously play the same game, the program controlling the game device to execute the following steps:

generating operation control status data representing a state of at least one operation control which is subjected to user manipulation;

receiving and transmitting the operation control status data from/to the other game device(s);

sequentially storing operation control status data associated with the plurality of interconnected game devices in response to a round of data communication; and retrieving, from among the plurality of sequentially stored operation control status data, the operation data associated with each of the plurality of game devices for use with game processing, wherein the retrieving step comprises:

retrieving, when the operation control status data stored as a result of a given round of data communication include valid operation control status data and invalid data, the valid operation control status data among the operation control status data resulting from a plurality of rounds of data communication including the given round, so that at least one such valid operation control status data is retrieved for each of the plurality of game devices, without retrieving at least some of the invalid data.

16. The storage device according to claim 15, wherein the retrieving step comprises:

retrieving, when operation control status data stored as a result of a given round of data communication include invalid data, none of the operation control status data resulting from the given round of data communication; and retrieving, when all of the operation control status data resulting from the given round of data communication are valid, all of the operation control status data resulting from the given round of data communication.

17. The storage device according to claim 15, wherein the retrieving step comprises:

retrieving, when the operation control status data stored as a result of a given round of data communication include valid operation control status data and invalid data, only the valid operation control status data, so that one valid operation control status data is retrieved for each of the plurality of game devices, wherein the one valid operation control status data for each game device is an earliest valid operation control status data among the operation key status data resulting from a plurality of rounds of data communication including the given round.

18. The storage device according to claim 15, wherein the invalid data includes delayed processing notice data for notifying the other game device(s) of delayed processing.

19. The storage device according to claim 18, wherein the program stored in the storage device causes the game device to further execute a step of temporarily storing data to be transmitted to the other game device(s), the step comprising:

writing the delayed processing notice data after transferring the stored data; and thereafter, when the operation control status data is input, overwriting the delayed processing notice data with the operation control status data.

20. The storage device according to claim 15, wherein the program stored in the storage device causes the game device to further execute a step of initiating data communication.

21. In a network of plural interconnected gaming devices each including a display and at least one user-operable control, a method of coordinating said plural interconnected gaming devices to allow a corresponding plurality of users to interactively play the same game together, comprising:

(a) determining, at each gaming device, whether a user has operated the user-operable control thereof, and updating associated user-operable control status data;

(b) periodically sharing said user-operable control status data with other interconnected gaming devices over the network; and (c) avoiding transmission and/or use of at least some invalid control status data.

22. The network of claim 21 wherein the plural gaming devices are synchronized with one another.

23. The network of claim 21 wherein at least some of the gaming devices are portable handheld devices.

24. In an online game system comprising plural interconnected gaming devices each including a user-manipulable operation control and a communication arrangement that communicates operation control status to the other plural interconnected gaming devices, a method performed at each said game device for synchronizing said plural gaming devices when playing a common game, said method comprising:

(a) receiving operating control status from the other game device(s);

(b) validating said received operation control status data for each game device; and then (c) using the validated operation control status data to update game play.

* * * * *